US010254558B2

(12) United States Patent
Matsuki et al.

(10) Patent No.: US 10,254,558 B2
(45) Date of Patent: Apr. 9, 2019

(54) OPTICAL ELEMENT WITH SPACED DIFFRACTION GRATINGS, AND DISPLAY APPARATUS

(71) Applicant: SEIKO EPSON CORPORATION, Tokyo (JP)

(72) Inventors: Hayato Matsuki, Suwa (JP); Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 71 days.

(21) Appl. No.: 15/460,882

(22) Filed: Mar. 16, 2017

(65) Prior Publication Data
US 2017/0276957 A1 Sep. 28, 2017

(30) Foreign Application Priority Data
Mar. 23, 2016 (JP) ................................ 2016-058100

(51) Int. Cl.
*G02B 5/18* (2006.01)
*G02B 27/42* (2006.01)
*G02B 27/01* (2006.01)

(52) U.S. Cl.
CPC ..... *G02B 27/4227* (2013.01); *G02B 27/0172* (2013.01); *G02B 27/4272* (2013.01); *G02B 5/1842* (2013.01); *G02B 2027/0178* (2013.01)

(58) Field of Classification Search
CPC .......................... G02B 5/18; G02B 2005/1809; G02B 5/1814; G02B 5/1828; G02B 5/1866; G02B 27/42; G02B 27/4233; G02B 27/425; G02B 27/4272; G02B 27/44
USPC ....... 359/558, 566, 569, 571, 573, 574, 575, 359/576
See application file for complete search history.

(56) References Cited

U.S. PATENT DOCUMENTS 5,742,262 A 4/1998 Tabata et al.
7,763,841 B1 * 7/2010 McEldowney .... B29D 11/0073
250/216

FOREIGN PATENT DOCUMENTS

JP H07-72422 A 3/1995
JP H10-255320 A 9/1998
JP 2008-197182 A 8/2008

* cited by examiner

*Primary Examiner* — Arnel C Lavarias
(74) *Attorney, Agent, or Firm* — Oliff PLC

(57) ABSTRACT

In an optical element, a first diffraction grating, a second diffraction grating, a third diffraction grating, and a fourth diffraction grating are formed in each of a first surface of a first substrate, a fourth surface of a second substrate, a fifth surface of a third substrate, and an eighth surface of a fourth substrate. Each substrate is fixed by (a first adhesive layer, second adhesive layer, and a third adhesive layer) adhesive layers including a gap material. A first filler with a refractive index equal to that of the first substrate and the second substrate is filled between the first substrate and the second substrate and a third filler formed of air or a medium with a refractive index equal to that of air is filled between the second substrate and the third substrate.

20 Claims, 13 Drawing Sheets

OPTICAL ELEMENT WITH SPACED DIFFRACTION GRATINGS, AND DISPLAY APPARATUS

BACKGROUND

1. Technical Field

The present disclosure relates to an optical element and a display apparatus.

2. Related Art

An optical element in which a plurality of diffraction gratings are arranged in the direction in which the light proceeds is used as a light flux splitting element of an image forming apparatus such as a laser printer or a pupil expansion element of a retina scanning type display apparatus. In order to configure the optical element, a structure in which two translucent substrates in which a diffraction grating is formed are adhered to each other using an adhesive agent in a state of being opposed to each other has been proposed (refer to FIG. 27 in JP-A-2008-197182).

In the optical element, it is necessary that the position of the grating of the diffraction grating is adjusted with high precision so as to extend in a predetermined direction and that the intervals between the diffraction grating are adjusted with high precision. In addition, it is necessary to arrange the diffraction gratings in parallel. However, as the optical element described in JP-A-2008 197182, in the structure in which two substrates are adhered to each other using an adhesive agent in state of being opposed to each other, there is a concern that changes in the intervals between the diffraction gratings, inclination with respect to the off-plane direction, or the like will be generated due to influences such as contraction of the adhesive agent.

SUMMARY

An advantage of some aspects of the embodiment is to provide an optical element which is able to appropriately adjust the position of a plurality of diffraction gratings which are arranged along the direction in which the light proceeds, and a display apparatus.

An aspect of the optical element according to the embodiment includes a first translucent substrate which is provided with a first surface and a second surface which is a surface on an opposite side of the first surface, a second translucent substrate which is provided with a third surface which is opposed to the second surface and a fourth surface which is a surface on an opposite side of the third surface, a first diffraction grating which is provided on at least one of the first surface and the second surface, a second diffraction grating which is provided on at least one of the third surface and the fourth surface, and a first adhesive layer which includes a first gap material which is interposed between the second surface and the third surface and which adheres the second surface and the third surface.

In the aspect of the embodiment, it is possible to control the interval between a first substrate and a second substrate with high precision using a first gap material and to arrange the first substrate and the second substrate in parallel with high precision using the first gap material. Accordingly, it is possible to control the interval between a first diffraction grating and a second diffraction grating with high precision and to arrange the first diffraction grating and the second diffraction grating in parallel with high precision. In addition, regarding the angular position of the second substrate in the in-plane direction with respect to the first substrate, before fixing with a first adhesive layer, it is possible to make light incident from the side of the first substrate, observe the light which is emitted from the second substrate, and adjust the angular position of the second substrate in the in-plane direction with respect to the first substrate based on the observation results. Accordingly, it is possible to arrange the first diffraction grating and the second diffraction grating at an appropriate orientation with high precision. For this reason, it is possible to appropriately adjust the position of a plurality of diffraction gratings which are arranged along the direction in which the light proceeds.

The optical element of another aspect (a first other aspect) of the embodiment is able to adopt a configuration in which the first diffraction grating is provided on the first surface, the second diffraction grating is provided on the fourth surface, the first adhesive layer is provided outside of an effective region through which light passes, and a first filler with a refractive index equal to that of the first substrate and the second substrate is filled between the second surface and the third surface in the effective region. According to this configuration, since the first substrate, the first filler, and the second substrate function as an integrated translucent body, it is possible to suppress refraction, reflection, and the like on the second surface and the third surface.

The optical element of still another aspect (a second other aspect) of the embodiment is able to adopt a configuration which has a third translucent substrate which is provided with a fifth surface which is opposed to the fourth surface and a sixth surface which is a surface on an opposite side of the fifth surface, a fourth translucent substrate which is provided with a seventh surface which is opposed to the sixth surface and an eighth surface which is a surface on an opposite side of the seventh surface, a third diffraction grating which is provided on the fifth surface, a fourth diffraction grating which is provided on the eighth surface, a second adhesive layer which includes a second gap material which is interposed between the sixth surface and the seventh surface and which adheres the sixth surface and the seventh surface outside of the effective region, a second filler which is filled between the sixth surface and the seventh surface in the effective region and with a refractive index equal to that of the third substrate and the fourth substrate, a third adhesive layer which includes a third gap material which is interposed between the fourth surface and the fifth surface and which adheres the fourth surface and the fifth surface outside of the effective region, and a third filler which is filled between the fourth surface and the fifth surface in the effective region and which is formed of air or a medium with a refractive index equal to that of air. According to this configuration, it is possible to control the interval between the third substrate and the fourth substrate with high precision using the second gap material and to arrange the third substrate and the fourth substrate in parallel with high precision using the second gap material. Accordingly, it is possible to control the interval between the third diffraction grating and the fourth diffraction grating with high precision and to arrange the third diffraction grating and the fourth diffraction grating in parallel with high precision. In addition, regarding the angular position of the fourth substrate in the in-plane direction with respect to the third substrate, before fixing by the second adhesive layer, it is possible to make light incident from the side of the third substrate, observe the light which is emitted from the fourth substrate, and adjust the angular position of the fourth substrate in the in-plane direction with respect to the third substrate based on the observation results. Accordingly, it is possible to arrange the third diffraction grating and the fourth diffraction grating at an appropriate orientation with high precision. In addition, since the third substrate, the second filler, and the fourth substrate function as an integrated translucent body, it is possible to suppress refraction, reflection, and the like on the sixth surface and the seventh surface. In addition, it is possible to control the interval between the second substrate and the third substrate with high precision using the second gap material and to arrange the second substrate and the third substrate in parallel with high precision. Accordingly, it is possible to control the interval between the second diffraction grating and the third diffraction grating with high precision and to arrange the second diffraction grating and the third diffraction grating in parallel with high precision. In addition, regarding a unit which is provided with the first substrate and the second substrate and a unit which is provided with the third substrate and the fourth substrate, before fixing by the third adhesive layer, for example, it is possible to make the light incident from the side of the first substrate and, when observing the light which is emitted from the fourth substrate, obtain observation results which match those in a case of using the optical element in practice. Therefore, based on the observation results, it is possible to arrange the units at an appropriate orientation with high precision. For this reason, it is possible to appropriately adjust the position of a plurality of diffraction gratings which are arranged along the direction in which the light proceeds. In addition, since the third filler is formed of air or a medium of which the refractive index is equal to that of air, it is possible to obtain the same optical characteristics as in a case where the fourth surface and the fifth surface are in an open state with respect to the atmosphere.

In still another aspect (a third other aspect) of the embodiment, it is possible to adopt a configuration in which the first diffraction grating is provided at least on the second surface, the second diffraction grating is provided at least on the third surface, the first adhesive layer is provided outside of the effective region through which light passes, and a filler which is formed of air or a medium with a refractive index equal to that of air is filled between the second surface and the third surface in the effective region. According to this configuration, it is possible to obtain the same optical characteristics as in a case where the second surface and the third surface are in an open state with respect to the atmosphere.

In the first other aspect of the embodiment, it is possible to adopt a configuration in which a plurality of concave portions or convex portions which each extend in the first direction are arrayed periodically in each of the first diffraction grating and the second diffraction grating and the plurality of concave portions or convex portions of each of the first diffraction grating and the second diffraction grating are arranged such that the grating periods are the same as each other. According to this configuration, it is possible to use the optical element as a pupil expansion element which expands light flux in the second direction which intersects with the first direction.

In addition, in the first other aspect of the embodiment, it is possible to adopt a configuration in which refractive indices of the first substrate, the first filler, and the second substrate are refractive indices in which +1 order diffraction light of a first light beam which is incident to the first diffraction grating is incident with respect to each of the first surface and the fourth surface at an angle of a critical angle or more and −1 order diffraction light of the first light beam which is incident to the first diffraction grating is incident with respect to each of the first surface and the fourth surface at an angle of a critical angle or more. According to this configuration, the +1 order diffraction light and the −1 order diffraction light of the first light beam which is diffracted by the first diffraction grating are transmitted through the inner portion of the first substrate, the first filler, and the second substrate in directions which are opposite to each other in the second direction which intersects with respect to the first direction and emitted from the second diffraction grating. Accordingly, it is possible to use the optical element as a pupil expansion element in which the pupil is expanded by the light being transmitted through the inner portion of the first substrate, the first filler, and the second substrate in directions which are opposite to each other in the second direction. In addition, since the +1 order diffraction light and the −1 order diffraction light of the first light beam are transmitted through the inner portion of the first substrate, the first filler, and the second substrate in a state of full reflection in directions which are opposite to each other in the second direction, the utilization efficiency of the light is high.

In the second other aspect of the embodiment, it is possible to adopt a configuration in which a plurality of concave portions or convex portions which each extend in the first direction are arrayed periodically in each of the first diffraction grating and the second diffraction grating, a plurality of concave portions or convex portions which each extend in the first direction or in the second direction which intersects with the first direction are arrayed periodically in each of the third diffraction grating and the fourth diffraction grating, the plurality of concave portions or convex portions of each of the first diffraction grating and the second diffraction grating are arranged such that the grating periods are the same as each other, and the plurality of concave portions or convex portions of each of the third diffraction grating and the fourth diffraction grating are arranged such that the grating periods are the same as each other. According to this configuration, it is possible to use the optical element as a pupil expansion element which expands the light flux in the first direction or the like.

In the third other aspect of the embodiment, it is possible to adopt an aspect in which the plurality of concave portions and convex portions of each of the third diffraction grating and the fourth diffraction grating each extend in the first direction, a grating period of the first diffraction grating is different from that of the third diffraction grating, the refractive index of the first substrate is a refractive index where +1 order diffraction light of a first light beam which is incident to the first diffraction grating is incident with respect to each of the first surface and the fourth surface at an angle of a critical angle or more and −1 order diffraction light of the first light beam which is incident to the first diffraction grating is incident with respect to each of the first surface and the fourth surface at an angle of a critical angle or more, and the refractive index of the third substrate is a refractive index where +1 order diffraction light of a second light beam when the second light beam of which a wavelength is different from that of the first light beam is incident to the third diffraction grating is incident with respect to each of the fifth surface and the eighth surface at an angle of a critical angle or more and −1 order diffraction light of the second light beam which is incident to the third diffraction grating is incident with respect to each of the fifth surface and the eighth surface at an angle of a critical angle or more. According to this configuration, the +1 order diffraction light and the −1 order diffraction light of the first light beam which is diffracted by the first diffraction grating are transmitted through the inner portion of the first substrate, the first filler, and the second substrate in directions which are opposite to each other in the second direction and emitted from the second diffraction grating. In addition, the +1 order diffraction light and the −1 order diffraction light of the second light beam which is diffracted by the third diffraction grating are transmitted through the inner portion of the first substrate, the first filler, and the second substrate in directions which are opposite to each other in the second direction and emitted from the fourth diffraction grating. Accordingly, it is possible to use the optical element as a pupil expansion element in which the pupil is expanded by the first light beam being transmitted through the inner portion of the first substrate, the first filler, and the second substrate in directions which are opposite to each other in the second direction and the pupil is expanded by the second light beam being transmitted through the inner portion of the third substrate, the second filler, and the fourth substrate in directions which are opposite to each other in the second direction. In addition, since the +1 order diffraction light and the −1 order diffraction light of the first light beam are transmitted through the inner portion of the first substrate, the first filler, and the second substrate in a state of full reflection in directions which are opposite to each other in the second direction and the +1 order diffraction light and the −1 order diffraction light of the second light beam are transmitted through the inner portion of the third substrate, the second filler, and the fourth substrate in a state of full reflection in directions which are opposite to each other in the second direction, the utilization efficiency of the light is high.

In this case, when a grating period of the first diffraction grating is P1 and a grating period of the third diffraction grating is P2, the grating periods P1 and P2 preferably satisfy the following relationship P1<P2. According to this configuration, in a case where the wavelengths of the first light beam and the second light beam have the following relationship First light beam<Second light beam, it is possible to make the emission intervals of each light beam uniform and to improve the light amount of emitted light or color uniformity.

In addition, when a grating height of the first diffraction grating is H11 and a grating height of the third diffraction grating is H21, the grating heights H11 and H21 preferably satisfy the following relationship H11<H21. According to this configuration, in a case where the first light beam and the second light beam have the following relationship First light beam<Second light beam, since it is possible to increase the 1 order diffraction efficiency of the light beam, the utilization efficiency of the light is high and to suppress unnecessary diffraction light.

In addition, when a grating height of the second diffraction grating is H12 and a grating height of the fourth diffraction grating is H22, the grating heights H11, H12, H21, and H22 preferably satisfy the following relationship H12<H11<H22<H21. According to this configuration, since the light is dispersed and emitted from the diffraction grating on the emission side, it is possible to optimize the light amount distribution in the emitted light.

In the third other aspect of the embodiment, it is possible to adopt an aspect in which the plurality of concave portions or convex portions which extend in the first direction are arrayed periodically in the first diffraction grating, and the plurality of concave portions or convex portions which extend in the first direction or in the second direction which intersects with the first direction are arrayed periodically in the second diffraction grating. According to this configuration, it is possible to use the optical element as a pupil expansion element which expands the light flux in the first direction or the like.

In the first other aspect and the third other aspect of the embodiment, it is possible to adopt an aspect in which the plurality of concave portions or convex portions are each arrayed periodically in the first direction and in the second direction which intersects with the first direction in the first diffraction grating and the second diffraction grating, and the plurality of concave portions or convex portions of each of the first diffraction grating and the second diffraction grating are arranged such that the grating period along the first direction are the same periods as each other and the grating periods along the second direction are the same period as each other. According to this configuration, it is possible to use the optical element as a pupil expansion element which expands the light flux in the first direction and the second direction.

In the second other aspect of the embodiment, it is possible to adopt a configuration in which the plurality of concave portions or convex portions are each arrayed periodically in the first direction and in the second direction which intersects with the first direction in the first diffraction grating, the second diffraction grating, the third diffraction grating, and the fourth diffraction grating, and the plurality of concave portions or convex portions of each of the first diffraction grating, the second diffraction grating, the third diffraction rating, and the fourth diffraction grating are arranged such that the grating periods along the first direction are the same periods as each other and the grating periods along the second direction are the same periods as each other. According to this configuration, it is possible to use the optical element as a pupil expansion element which expands the light flux in the first direction and the second direction.

A display apparatus which uses the optical element according to the embodiment is provided with a light source which emits light flux, a scanning optical system which makes an image by scanning light flux which is emitted from the light source, and an optical guiding system which makes the light flux which is scanned by the scanning optical system incident to eyes of a user, in which the optical element is arranged in a light path which covers from the scanning optical system to the optical guiding system or a light path of the optical guiding system.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Description will be given below of embodiments. Here, in the diagrams which are referred to in the description below, the scales are different for each layer or each member in order to make each of the layers or each of the members a recognizable size in the diagrams. In addition, in the description below, description will be given in which D1 refers to the first direction in an in-plane direction of an optical element 1000, D2 refers to the direction which intersects with the first direction D1 at a right angle in the in-plane direction, and the direction which intersects with the first direction D1 and the second direction D2 at a right angle is set as a third direction D3.

Embodiment 1

Figure 1:
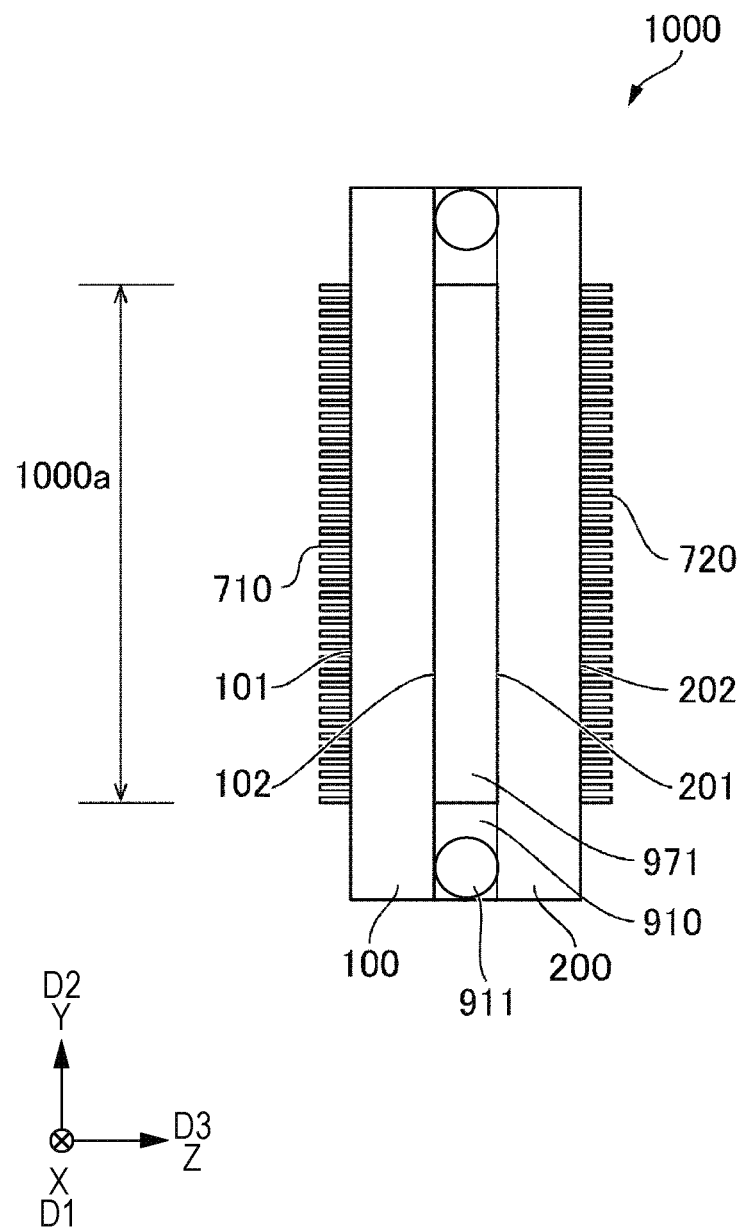
FIG. 1 is a cross-sectional diagram which illustrates an aspect of an optical element according to Embodiment 1.

The optical element 1000 shown in FIG. 1 has a first translucent substrate 100 which is provided with a first surface 101 and a second surface 102 which is a surface on the opposite side of the first surface 101 and a second translucent substrate 200 which is provided with a third surface 201 which is opposed to the second surface 102 and a fourth surface 202 which is a surface on the opposite side of the third surface 201. The first surface 101 and the second surface 102 are in parallel in the first substrate 100 and the third surface 201 and the fourth surface 202 are in parallel in the second substrate 200.

The optical element 1000 has a first diffraction grating 710 which is provided on at least one of the first surface 101 and the second surface 102 and a second diffraction grating 720 which is provided on at least one of the third surface 201 and the fourth surface 202. In the present embodiment, the first diffraction grating 710 is provided on the first surface 101 and the second diffraction. grating 720 is provided on the fourth surface 202. The first diffraction grating 710 and the second diffraction grating 720 are surface relief-type diffraction gratings.

As will be described below with reference to FIG. 9, concave portions or convex portions which extend in a straight line in the first direction D1 are arrayed periodically in the second direction D2 in the first diffraction grating 710 and the second diffraction grating 720 and the first diffraction grating 710 and the second diffraction grating 720 are arranged such that the grating periods of the concave portions or convex portions of each are the same period. For this reason, the optical element 1000 is formed as a pupil expansion element which expands the incident light flux in the second direction D2.

In the optical element 1000 which is formed in this manner, the second surface 102 and the third surface 201 are fixed by a first adhesive layer 910 which includes a first gap material 911 in a spherical form or a columnar form on the outside of an effective region 1000a which is used as a region through which the light passes. The first gap material 911 is interposed between the second surface 102 and the third surface 201 and is in contact with the second surface 102 and the third surface 201. In addition, in the effective region 1000a, a first filler 971 such as oil of which the refractive index is equal to that of the first substrate 100 and the second substrate 200 is filled between the second surface 102 and the third surface 201. Therefore, it is possible to control the interval between the first substrate 100 and the second substrate 200 with high precision using the first gap material 911 and to arrange the first substrate 100 and the second substrate 200 in parallel with high precision using the first gap material 911. In addition, since the refractive index of the first filler 971 is equal to that of the first substrate 100 and the second substrate 200, the first substrate 100, the first filler 971, and the second substrate 200 function as an integrated translucent body. Accordingly, it is possible to suppress refraction, reflection, and the like on the second surface 102 and the third surface 201.

Here, examples of the material which is able to be used for the first filler 971 include silicone oil, a fluorocarbon based liquid, a methylene iodide based liquid, an acryl based resin, and the like.

Here, since a portion of the first adhesive layer 910 is cut off in an extending direction, when manufacturing the optical element 1000, after adhering the first substrate 100 and the second substrate 200 using the first adhesive layer 910, the first filler 971 is decompressed and inserted between the first substrate 100 and the second substrate 200 from the cut off portion of the first adhesive layer 910 and, after that, the cut off portion of the first adhesive layer 910 is blocked by a sealing material.

In this manner, since the present embodiment has a structure in which the first substrate 100 and the second substrate 200 are fixed by the first adhesive layer 910 which includes the first gap material 911, it is possible to control the interval between the first diffraction grating 710 and the second diffraction grating 720 with high precision using the first gap material 911 and to arrange the first diffraction grating 710 and the second diffraction grating 720 in parallel with high precision using the first gap material 911.

In addition, regarding the angular position of the second substrate 200 in the in-plane direction with respect to the first substrate 100, before fixing the first substrate 100 and the second substrate 200 using the first adhesive layer 910, the light is made to be incident from the side of the first substrate 100, the light which is emitted from the second substrate 200 is observed, and, based on the observation results, the angular position of the second substrate 200 in the in-plane direction with respect to the first substrate 100 is adjusted, and after that, fixed using the first adhesive layer

Figure 2:
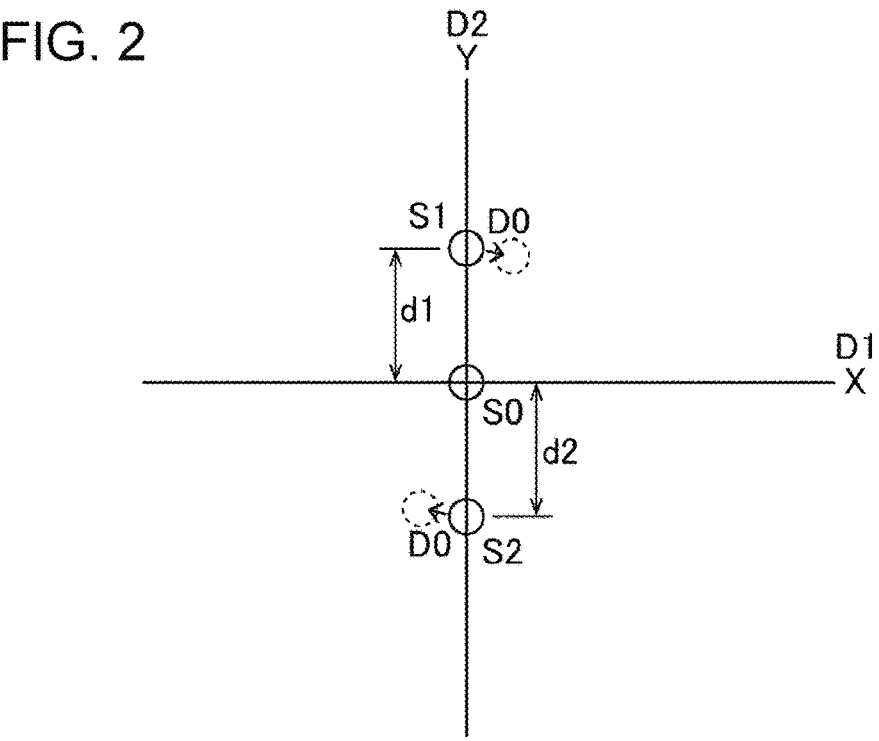
FIG. 2 is an explanatory diagram of a spot which is obtained in an angle adjusting step when manufacturing the optical element according to Embodiment 1.

910. Accordingly, it is possible to arrange the first diffraction grating 710 and the second diffraction grating 720 in the appropriate direction with high precision. In more detail, when laser light is incident from the side of the first substrate 100 in a state where the first substrate 100 and the second substrate 200 are opposed to each other in parallel and spots are detected using an autocollimator from the light which is emitted from the second substrate 200, a spot S0 which accompanies 0 order diffraction light, a spot S1 which accompanies +1 order diffraction light, and a spot S2 which accompanies −1 order diffraction light are detected as shown in FIG. 2. At this time, when an angular position of the second substrate 200 in the in-plane direction with respect to the first substrate 100 is appropriate, the spots S0, S1, and S2 are lined up linearly along the second direction D2. Accordingly, when the first substrate 100 and the second substrate 200 are fixed using the first adhesive layer 910 which includes the first gap material 911, it is possible to match the angular position in the in-plane direction of the first diffraction grating 710 and the third diffraction grating 730 with high precision.

In contrast to this, when the angular position in the in-plane direction of the second substrate 200 with respect to the first substrate 100 is shifted, the spots S0, S1, and S2 are lined up linearly in the direction which is inclined with respect to the second direction D2 as shown with an arrow D0. In this case, after adjusting the angular position of the second substrate 200 in the in-plane direction with respect to the first substrate 100, laser light or the like is made to be incident from the side of the first substrate 100 again and the spots S0, S1, and S2 which are emitted from the second substrate 200 are observed. In the observation results, when the spot S1, S2, and S3 are lined up linearly along the second direction D2, the first substrate 100 and the second substrate 200 are fixed using the first adhesive layer 910 which includes the first gap material 911. For this reason, it is possible to match the angular positions of the first diffraction grating 710 and the third diffraction grating 730 in the in-plane direction with high precision. In contrast to this, in a case where the alignment precision of alignment marks is approximately 5 μm in general photolithography or an imprint apparatus and a point on a circumference with an effective diameter Φ 10 mm is shifted by 5 μm in the shortest straight line, the rotational angle is 0.05729° (=3.4 minutes of a clock-clock 206 seconds). In contrast to this, since the resolving power of a general autocollimator is approximately 1 second on the clock, when the angle of the spot S0 and the spot S1 which are emitted is matched within 5.3 seconds on the clock, it is possible to obtain high precision such as the shift of the rotational angle being within 5 seconds on the clock.

In addition, in the optical element 1000 of the present embodiment, in a state where manufacturing is completed, the interval between the first diffraction grating 710 and the second diffraction grating 720 is controlled by the first gap material 911 with high precision and the first diffraction grating 710 and the second diffraction grating 720 are arranged parallel with high precision. For this reason, in the spots S0, S1, and S2 shown in FIG. 2, an interval d1 between the spot S0 and the spot S1 and an interval d2 between the spot S0 and the spot S2 are equal and the intervals d1 and d2 are appropriate values. For example, in a case where the first substrate 100 and the second substrate 200 are adhered using only an adhesive layer, an error of approximately 2 μm is generated. In this case, when assuming that the size of the pupil expansion is Φ 10 mm, since the shift is 2 μm with respect to Φ 10 mm, the shift is 0.011° (=0.69 minutes on the clock=41 seconds on the clock). In contrast to this, since the precision of the gap material (the first gap material 911) is approximately 3%, for example, the shift is 150 nm in a case of using a gap material of 5 μm, and, with 150 nm with respect to 10 mm, the precision is improved up to 0.00086° (=0.05 minutes on the clock=3 seconds on the clock)

Here, in the present embodiment, the refractive index of the first filler 971 is equal to that of the first substrate 100 and the second substrate 200; however, the embodiment may be an aspect in which the refractive index of the first filler 971 is different from that of the first substrate 100 and the second substrate 200. In this case, it is possible to obtain the same effects as in a case of adjusting the substrate interval between the first substrate 100 and the second substrate 200 and to perform adjustment of the distance between shown in FIG. 2.

Modification Example of Embodiment 1

FIG. 2 is an explanatory diagram of a spot which is obtained in an angle adjusting step when manufacturing the optical element 1000 according to a Modification Example of Embodiment 1. In Embodiment 1, the concave portions or convex portions which extend in a straight line in the first direction D1 are arrayed periodically in the first diffraction grating 710 and the second diffraction grating 720; however, in the first diffraction grating 710 and the second diffraction grating 720, as will be described with reference to FIG. 12 and the like, a configuration in which the concave portions or convex portions are arrayed periodically in the first direction D1 and the second direction D2 may be adopted. In this case, the first diffraction grating 710 and the second diffraction grating 720 are arranged such that the grating periods along the first direction of the concave portions or convex portions of each are the same periods and are arranged such that the grating periods along the second direction D2 of the concave portions or convex portions of each are the same period. According to this configuration, it is possible to configure the optical element 1000 as a pupil expansion element which expands light flux in the first direction D1 and the second direction D2.

Figure 3:
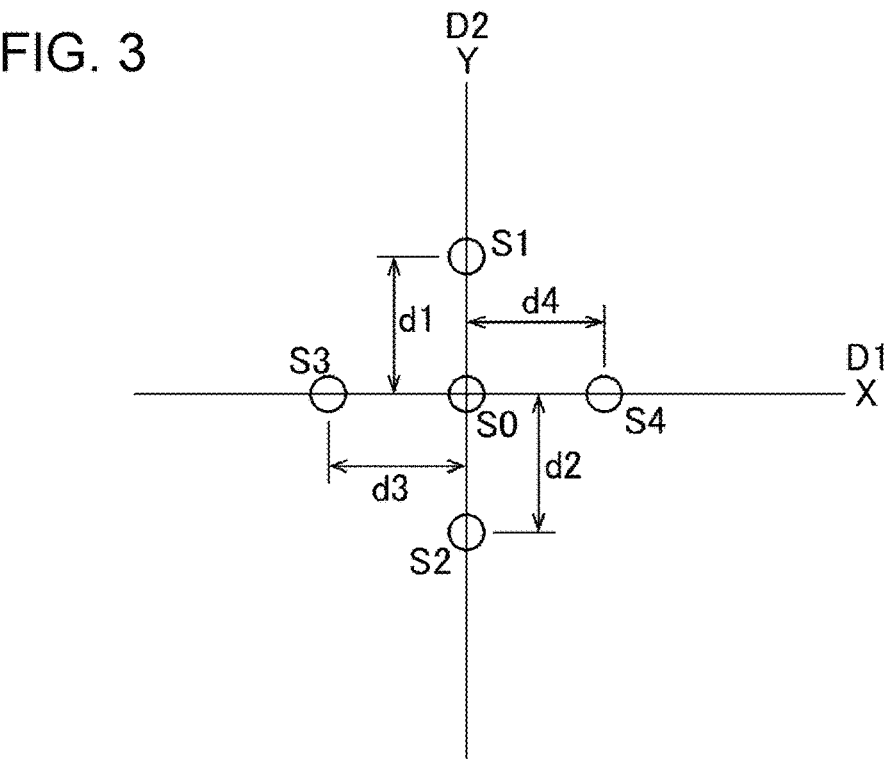
FIG. 3 is an explanatory diagram of a spot which is obtained in an angle adjusting step when manufacturing the optical element according to a Modification Example of Embodiment 1.

In this case, in the step of adjusting the angular position of the first substrate 100 and the second substrate 200, when laser light or the like is made to be incident from the side of the first substrate 100, the light which is emitted from the second substrate 200 forms the spots S0, S1, and S2 which are lined up in the second direction D2 and the spots S0, S3, and S4 which are lined up in the first direction D1 as shown in FIG. 3. Accordingly, based on the observation results of the spots S0, S1, S2, S3, and S4, it is possible to adjust the angle of the first substrate 100 and the second substrate 200. For this reason, in the optical element 1000, in a state where manufacturing is completed, the spots S0, S1, and S2 are lined up in a straight line formed along the second direction D2 and the spots S0, S3, and S4 are lined up in a straight line formed along the second direction D2. In addition, an interval d1 between the spot S0 and the spot S1 and the interval d2 between the spot S0 and the spot S2 are equal and the intervals d1 and d2 are appropriate values. In addition, an interval d3 between the spot S0 and the spot S3 and an interval d4 between the spot S0 and the spot S4 are equal and the intervals d3 and d4 are appropriate values.

Embodiment 2

Figure 4:
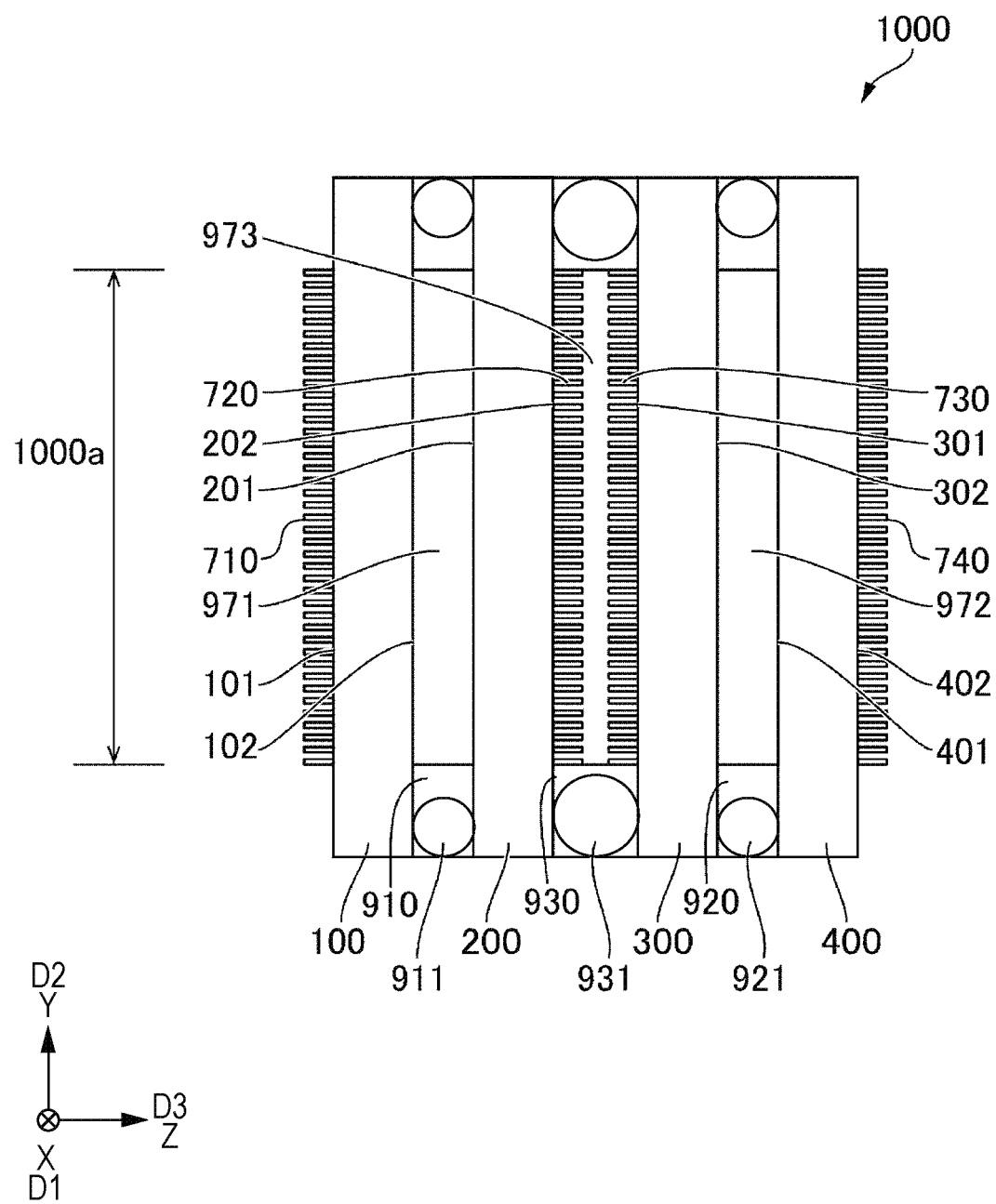
FIG. 4 is a cross-sectional diagram which is an aspect of the optical element according to Embodiment 2.

FIG. 4 is a cross-sectional diagram which illustrates an aspect of the optical element 1000 according to Embodiment 2. In the same manner as Embodiment 1, the optical element 1000 shown in FIG. 4 has the first translucent substrate 100 which is provided with the first surface 101 and the second surface 102 which is a surface on the opposite side of the first surface 101 and the second translucent substrate 200 which is provided with the third surface 201 which is opposed to the second surface 102 and the fourth surface 202 which is a surface on the opposite side of the third surface 201. Also in the present embodiment, in the same manner as Embodiment 1, in the first substrate 100, the first diffraction grating 710 is provided on the first surface 101 and the second diffraction grating 720 is provided on the fourth surface 202. The concave portions or convex portions which extend in a straight line formed in the first direction D1 are arrayed periodically in the second direction D2 in the first diffraction grating 710 and the second diffraction grating 720 and the first diffraction grating 710 and the second diffraction grating 720 are arranged such that the grating periods of the concave portions or convex portions of each are the same periods.

In the present embodiment, the optical element 1000 has a third translucent substrate 300 which is provided with a fifth surface 301 which is opposed to the fourth surface 202 and a sixth surface 302 which is a surface on the opposite side of the fifth surface 301, and a fourth translucent substrate 400 which is provided with a seventh surface 401 which is opposed to the sixth surface 302 and an eighth surface 402 which is a surface on the opposite side of the seventh surface 401. The fifth surface 301 and the sixth surface 302 are in parallel in the third substrate 300 and the seventh surface 401 and the eighth surface 402 are in parallel in the fourth substrate 400.

The optical element 1000 has a third diffraction grating 730 which is provided on at least one of the fifth surface 301 and the sixth surface 302 and a fourth diffraction grating 740 which is provided on at least one of the seventh surface 401 and the eighth surface 402. In the present embodiment, the third diffraction grating 730 is provided on the fifth surface 301 and the fourth diffraction grating 740 is provided on the eighth surface 402. The concave portions or convex portions which extend in a straight line formed in the first direction D1 are arrayed periodically in the second direction D2 in the third diffraction grating 730 and the fourth diffraction grating 740 and the third diffraction grating 730 and the fourth diffraction grating 740 are arranged such that the grating periods of the concave portions or convex portions of each are the same periods. In the present embodiment, the first diffraction grating 710, the second diffraction grating 720, the third diffraction grating 730, and the fourth diffraction grating 740 are arranged such that the grating periods of the concave portions or convex portions of each are the same periods. For this reason, the optical element 1000 is formed as a pupil expansion element which, after expanding the incident light flux in the second direction D2 using the first diffraction grating 710 and the second diffraction grating 720, further expands the light in the second direction D2 using the third diffraction grating 730 and the fourth diffraction grating 740. The first diffraction grating 710, the second diffraction grating 720, the third diffraction grating 730, and the fourth diffraction grating 740 are surface relief-type diffraction gratings.

Here, the grating periods of the first diffraction grating 710 and the second diffraction grating 720 are equal and the grating periods of the third diffraction grating 730 and the fourth diffraction grating 740 are equal; however, the grating period may be formed to be different in the first diffraction grating 710 and the third diffraction grating 730. In addition, the extending direction of the grating is the same in the first diffraction grating 710 and the second diffraction grating 720 and the extending direction of the grating is the same in the third diffraction grating 730 and the fourth diffraction grating 740; however, there may be configurations in which the grating extends in the first direction D1 in the first diffraction grating 710 and the grating extends in the second direction D2 in the third diffraction grating 730.

In the optical element 1000 which is formed in this manner, in the same manner as Embodiment 1, the second surface 102 and the third surface 201 are fixed by the first adhesive layer 910 which includes the first gap material 911 on the outside of the effective region 1000*a* and the first filler 971 of which the refractive index is equal to that of the first substrate 100 and the second substrate 200 is filled between the second surface 102 and the third surface 201 in the effective region 1000*a*. Accordingly, it is possible to control the interval between the first substrate 100 and the second substrate 200 with high precision using the first gap material 911 and to arrange the first substrate 100 and the second substrate 200 in parallel with high precision. In addition, it is possible to suppress refraction, reflection, and the like on the second surface 102 and the third surface 201.

In addition, the sixth surface 302 and the seventh surface 401 are fixed by the second adhesive layer 920 which includes a second gap material 921 in a spherical form or a columnar form on the outside of the effective region 1000*a* and a second filler 972 such as oil of which the refractive index is equal to that of the third substrate 300 and the fourth substrate 400 is filled between the sixth surface 302 and the seventh surface 401 in the effective region 1000*a*. The second gap material 921 is interposed between the sixth surface 302 and the seventh surface 401 and in contact with the sixth surface 302 and the seventh surface 401. Accordingly, it is possible to control the interval between the third substrate 300 and the fourth substrate 400 with high precision using the second gap material 921 and to arrange the third substrate 300 and the fourth substrate 400 in parallel with high precision. In addition, since the refractive index of the second filler 972 is equal to that of the third substrate 300 and the fourth substrate 400, the third substrate 300, the second filler 972, and the fourth substrate 400 function as an integrated translucent body. Accordingly, it is possible to suppress refraction, reflection, and the like on the sixth surface 302 and the seventh surface 401. Here, a portion of the second adhesive layer 920 is cut off in an extending direction in the same manner as the first adhesive layer 910. For this reason, when manufacturing the optical element 1000, after adhering the third substrate 300 and the fourth substrate 400 using the second adhesive layer 920, the second filler 972 is decompressed and inserted between the third substrate 300 and the fourth substrate 400 from the cut off portion of the second adhesive layer 920 and, after that, the cut off portion of the second adhesive layer 920 is blocked by a sealing material.

In addition, in the present embodiment, the fourth surface 202 and the fifth surface 301 are fixed by a third adhesive layer 930 which includes a third gap material 931 in a spherical form or a columnar form on the outside of the effective region 1000*a*. The third gap material 931 is interposed between the fourth surface 202 and the fifth surface 301 and is in contact with the fourth surface 202 and the fifth surface 301. Accordingly, it is possible to control the interval between the second substrate 200 and the third substrate 300 with high precision using the third gap material 931 and to arrange the second substrate 200 and the third substrate 300 in parallel with high precision. In addition, in the effective region 1000*a*, a third filler 973 which is formed of air or a medium of which the refractive index is equal to that of air is filled between the fourth surface 202 and the fifth surface 301. Accordingly, it is possible to obtain the same optical characteristics as in a case where the fourth surface 202 and the fifth surface 301 are in an open state with respect to the atmosphere.

In this manner, in the present embodiment, it is possible to control the interval between the first substrate 100 and the second substrate 200 with high precision using the first gap material 911 and to arrange the first substrate 100 and the second substrate 200 in parallel with high precision using the first gap material 911. In addition, it is possible to control the interval between the third substrate 300 and the fourth substrate 400 with high precision using the second gap material 921 and to arrange the third substrate 300 and the fourth substrate 400 in parallel with high precision using the second gap material 921. Furthermore, it is possible to control the interval between the second substrate 200 and the third substrate 300 with high precision using the third gap material 931 and to arrange the second substrate 200 and the third substrate 300 in parallel with high precision using the third gap material 931. For this reason, it is possible to control each interval between the first diffraction grating 710, the second diffraction grating 720, the third diffraction grating 730, and the fourth diffraction grating 740 with high precision and to arrange each of the diffraction gratings in parallel with high precision. In addition, it is possible to adjust the angular position of the second substrate 200 in the in-plane direction with respect to the first substrate 100 by the method described with reference to FIG. 2 and to adjust the angular position of the fourth substrate 400 in the in-plane direction with respect to the third substrate 300 by the method described with reference to FIG. 2. Furthermore, it is also possible to adjust a first unit which has the first substrate 100 and the second substrate 200 and a second unit which has the third substrate 300 and the fourth substrate 400 by the method described with reference to FIG. 2. For this reason, it is possible to match the angular positions of the first diffraction grating 710, the second diffraction grating 720, the third diffraction grating 730, and the fourth diffraction grating 740 in the in-plane direction with high precision.

Modification Example 1 of Embodiment 2

In the first diffraction grating 710, the second diffraction grating 720, the third diffraction grating 730, and the fourth diffraction grating 740, a configuration may be adopted in which the concave portions or convex portions are arrayed periodically in the first direction D1 and the second direction D2. In this case, the first diffraction grating 710, the second diffraction grating 720, the third diffraction grating 730, and the fourth diffraction grating 740 are arranged such that the grating periods along the first direction D1 of each of the concave portions or convex portions are the same periods and are arranged such that the grating periods along the second direction D2 of each of the concave portions or convex portions are the same periods. According to this configuration, it is possible to configure the optical element 1000 as a pupil expansion element which expands light flux in the first direction D1 and the second direction D2.

Modification Example 2 of Embodiment 2

Figure 5:
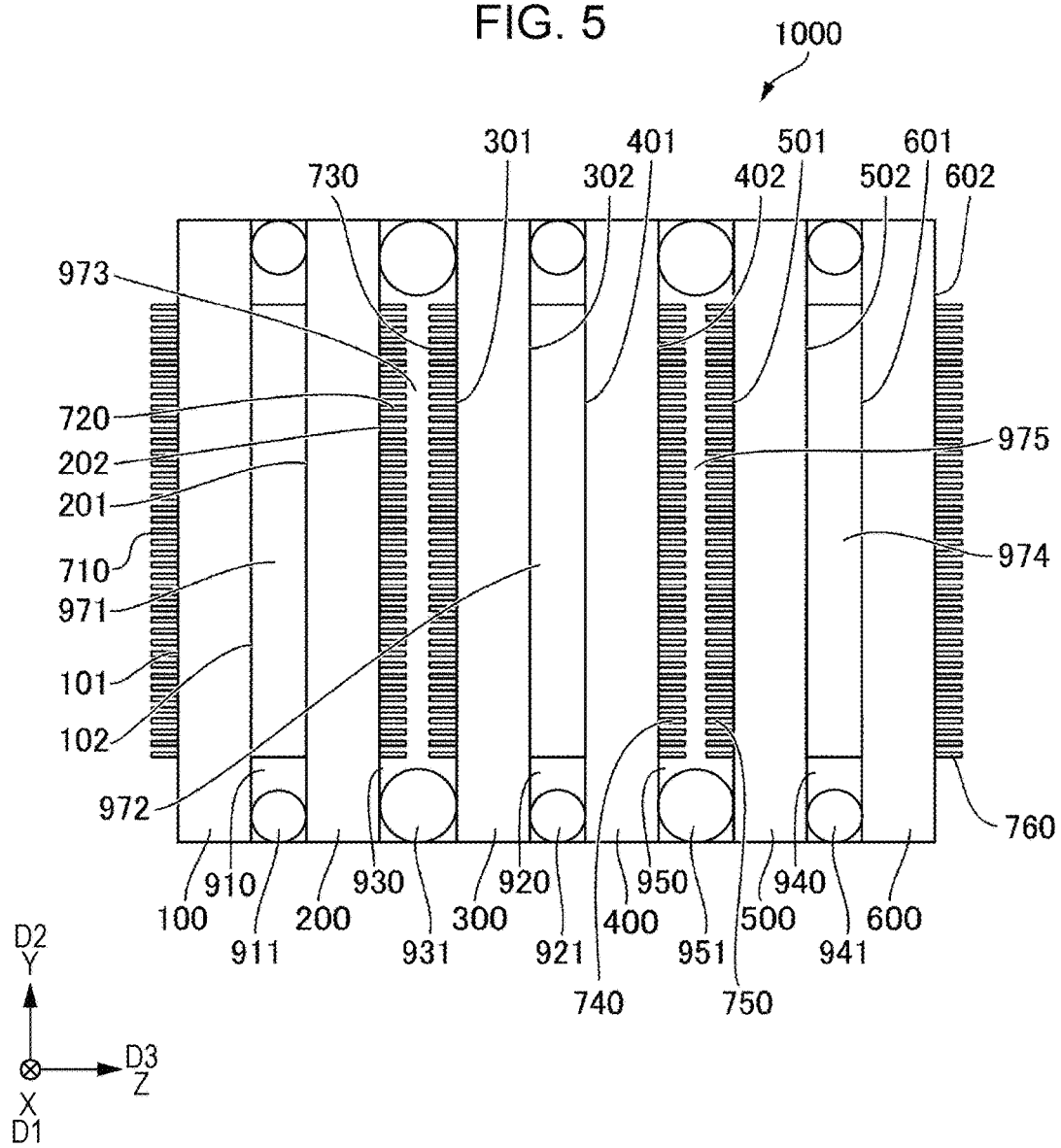
FIG. 5 is a cross-sectional diagram which is an aspect of the optical element of Modification Example 2 of Embodiment 2.

FIG. 5 is a cross-sectional diagram which illustrates an aspect of the optical element 1000 according to Modification Example 2 of Embodiment 2. In addition to the configuration described in Embodiment 2, the optical element 1000 shown in FIG. 4 has a fifth substrate 500 which is provided with a ninth surface 501 which is opposed to the eighth surface 402 and a tenth surface 502 which is a surface on the opposite side of the ninth surface 501 and a sixth substrate 600 which is provided with an eleventh surface 601 which is opposed to the tenth surface 502 and a twelfth surface 602 which is a surface on the opposite side of the eleventh surface 601. In addition, the optical element 1000 has a fifth diffraction grating 750 which is provided on the ninth surface 501 and a sixth diffraction grating 760 which is provided on the twelfth surface 602. In the same manner as the first diffraction grating 710, the second diffraction grating 720, the third diffraction grating 730, and the fourth diffraction grating 740, the concave portions or convex portions which extend in a straight line in the first direction D1 are arrayed periodically in the fifth diffraction grating 750 and the sixth diffraction grating 760, and the fifth diffraction grating 750 and the sixth diffraction grating 760 are arranged such that the grating periods of each of the concave portions or convex portions are the same periods.

In the present embodiment, the first diffraction grating 710, the second diffraction grating 720, the third diffraction grating 730, the fourth diffraction grating 740, the fifth diffraction grating 750, and the sixth diffraction grating 760 are arranged such that the grating periods of each of the concave portions or convex portions are the same periods. For this reason, the optical element 1000 is formed as a pupil expansion element which, after expanding the incident light flux in the second direction D2 using the first diffraction grating 710 and the second diffraction grating 720, expands the light flux in the second direction D2 using the third diffraction grating 730 and the fourth diffraction grating 740 and further expands the light flux in the second direction D2 using the fifth diffraction grating 750 and the sixth diffraction grating 760.

In addition, the grating periods of the first diffraction grating 710 and the second diffraction grating 720 are equal, the grating periods of the third diffraction grating 730 and the fourth diffraction grating 740 are equal, and the grating periods of the fifth diffraction grating 750 and the sixth diffraction grating 760 are equal; however, a configuration may be adopted in which the grating periods are different in the first diffraction grating 710, the third diffraction grating 730, and the fifth diffraction grating 750.

In addition, in the first diffraction grating 710, the second diffraction grating 720, the third diffraction grating 730, the fourth diffraction grating 740, the fifth diffraction grating 750, and the sixth diffraction grating 760, a configuration may be adopted in which the concave portions or convex portions are arrayed periodically in the first direction D1 and the second direction D2 and, in this case, each diffraction grating is arranged such that the grating periods along the first direction D1 of each of the concave portions or convex portions are the same periods and is arranged such that the grating periods along the second direction D2 of each of the concave portions or convex portions are the same periods.

In the optical element 1000 which is formed in this manner, the tenth surface 502 and the eleventh surface 601 are fixed by a fourth adhesive layer 940 which includes a fourth gap material 941 in a spherical form or a columnar form outside the effective region 1000a and a fourth filler 974 such as oil of which the refractive index is equal to that of the fifth substrate 500 and the sixth substrate 600 is filled between the tenth surface 502 and the eleventh surface 601 in the effective region 1000a.

In addition, the eighth surface 402 and the ninth surface 501 are fixed by a fifth adhesive layer 950 which includes a fifth gap material 951 in a spherical form or a columnar form outside the effective region 1000a and a fifth filler 975 which is formed of air or a medium with a refractive index equal to that of air is filled between the eighth surface 402 and the ninth surface 501 in the effective region 1000a.

The optical element 1000 which is formed in this manner also exhibits effects such as that it is possible to arrange the first diffraction grating 710, the second diffraction grating 720, the third diffraction grating 730, the fourth diffraction grating 740, the fifth diffraction grating 750, and the sixth diffraction grating 760 in an appropriate position with high precision for the same reasons as the reasons described in Embodiments 1 and 2 and the like.

Embodiment 3

Figure 6:
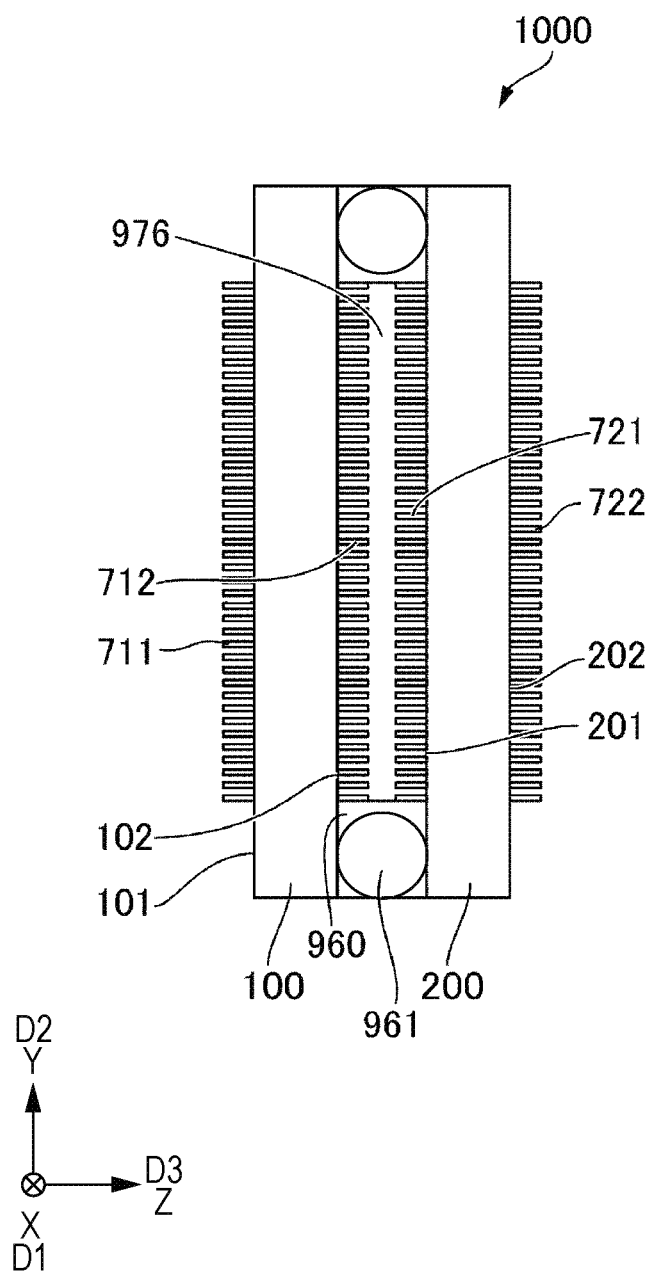
FIG. 6 is a cross-sectional diagram which is an aspect of an optical element according to Embodiment 3.

FIG. 6 is a cross-sectional diagram which illustrates an aspect of the optical element 1000 according to Embodiment 3. In the same manner as Embodiment 1, the optical element 1000 shown in FIG. 1 has the first substrate 100 which is provided with the first surface 101 and the second surface 102 which is a surface on the opposite side of the first surface 101, and the second substrate 200 which is provided with the third surface 201 which is opposed to the second surface 102 and the fourth surface 202 which is a surface on the opposite side of the third surface 201. In addition, the optical element 1000 has the first diffraction grating 710 which is provided on at least one of the first surface 101 and the second surface 102 and the second diffraction grating 720 which is provided on at least one of the third surface 201 and the fourth surface 202.

In the present embodiment, in the first substrate 100, a first diffraction grating 711 on the incident side is provided on the first surface 101 and a first diffraction grating 712 on the emission side provided on the second surface 102. In the second substrate 200, a second diffraction grating 721 on the incident side is provided on the third surface 201 and a second diffraction grating 722 on the emission side is provided on the fourth surface 202. The first diffraction gratings 711 and 712 and the second diffraction gratings 721 and 722 are surface relief-type diffraction gratings.

The concave portions or convex portions which extend in a straight line in the first direction D1 are arrayed periodically in the first diffraction gratings 711 and 712 and the second diffraction gratings 721 and 722. The first diffraction gratings 711 and 712 are arranged such that the grating periods of the concave portions or convex portions of each are the same periods. The second diffraction gratings 721 and 722 are arranged such that the grating periods of the concave portions or convex portions of each are the same periods. In the present embodiment, the first diffraction gratings 711 and 712 and the second diffraction gratings 721 and 722 are arranged such that the grating periods of the concave portions or convex portions of each are the same periods. For this reason, as will be described below, the optical element 1000 is formed as a pupil expansion element which expands the incident light flux in the second direction D2.

Here, in the first diffraction gratings 711 and 712 and the second diffraction gratings 721 and 722, a configuration may be adopted in which the grating periods are different. In addition, in the first diffraction gratings 711 and 712 and the second diffraction gratings 721 and 722, a configuration may be adopted in which the extending directions of the gratings are different.

In the optical element 1000 which is formed in this manner, the second surface 102 and the third surface 201 are fixed by an adhesive layer 960 (the first adhesive layer) which includes a gap material 961 (the first gap material) in a circular form or a columnar form outside the effective region 1000*a*. The gap material 961 is interposed between the second surface 102 and the third surface 201 and is in contact with the second surface 102 and the third surface 201. Accordingly, it is possible to control the interval between the first substrate 100 and the second substrate 200 with high precision using the gap material 961 and to arrange the first substrate 100 and the second substrate 200 in parallel with high precision. In addition, in the effective region 1000*a*, a filler 976 which is formed of air or a medium with a refractive index equal to that of air is filled between the second surface 102 and the third surface 201.

In this manner, in the present embodiment, it is possible to control the interval between the first substrate 100 and the second substrate 200 with high precision using the gap material 961 and to arrange the first substrate 100 and the second substrate 200 in parallel with high precision using the gap material 961. Accordingly, it is possible to control the interval between the first diffract grating 712 and the second diffraction grating 721 with high precision and to arrange the first diffraction grating 711 and the second diffraction grating 721 in parallel with high precision. In addition, by adjusting by the method with reference to FIG. 2, it is possible to match the angular positions of the first diffraction gratings 711 and 512 and the second diffraction gratings 721 and 522 in the in-plane direction with high precision. In addition, since the filler 976 is formed of air or a medium of which the refractive index is equal to that of air, it is possible to obtain the same optical characteristics as in a case where the second surface 102 and the third surface 201 are in an open state with respect to the atmosphere.

Modification Example of Embodiment 3

In Embodiment 3, the concave portions or convex portions which extend in a straight line are arrayed periodically in the first diffraction gratings 711 and 712 and the second diffraction gratings 721 and 722; however, in the first diffraction gratings 711 and 712 and the second diffraction gratings 721 and 722, a configuration may be adopted in which the concave portions or convex portions are arrayed periodically in the first direction D1 and the second direction D2. In this case, the first diffraction gratings 711 and 712 and the second diffraction gratings 721 and 722 are arranged such that the grating periods along the first direction D1 of each of the concave portions or convex portions are the same periods and are arranged such that the grating periods along the second direction D2 of each of the concave portions or convex portions are the same periods. According to this configuration, it is possible to configure the optical element 1000 as a pupil expansion element which expands light flux in the first direction D1 and the second direction D2.

First Configuration Example of Display Apparatus 10000

Figure 7:
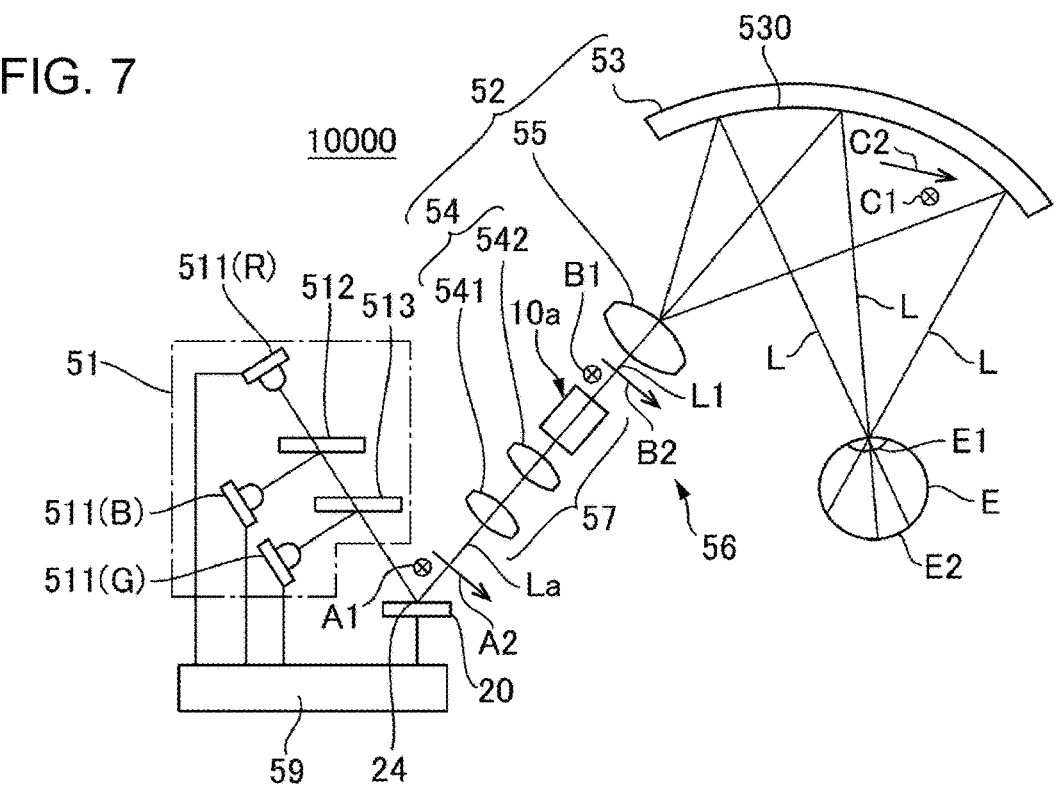
FIG. 7 is an explanatory diagram of a configuration of an optical system in the first configuration example of a display apparatus to which the embodiment is applied.
Figure 8:
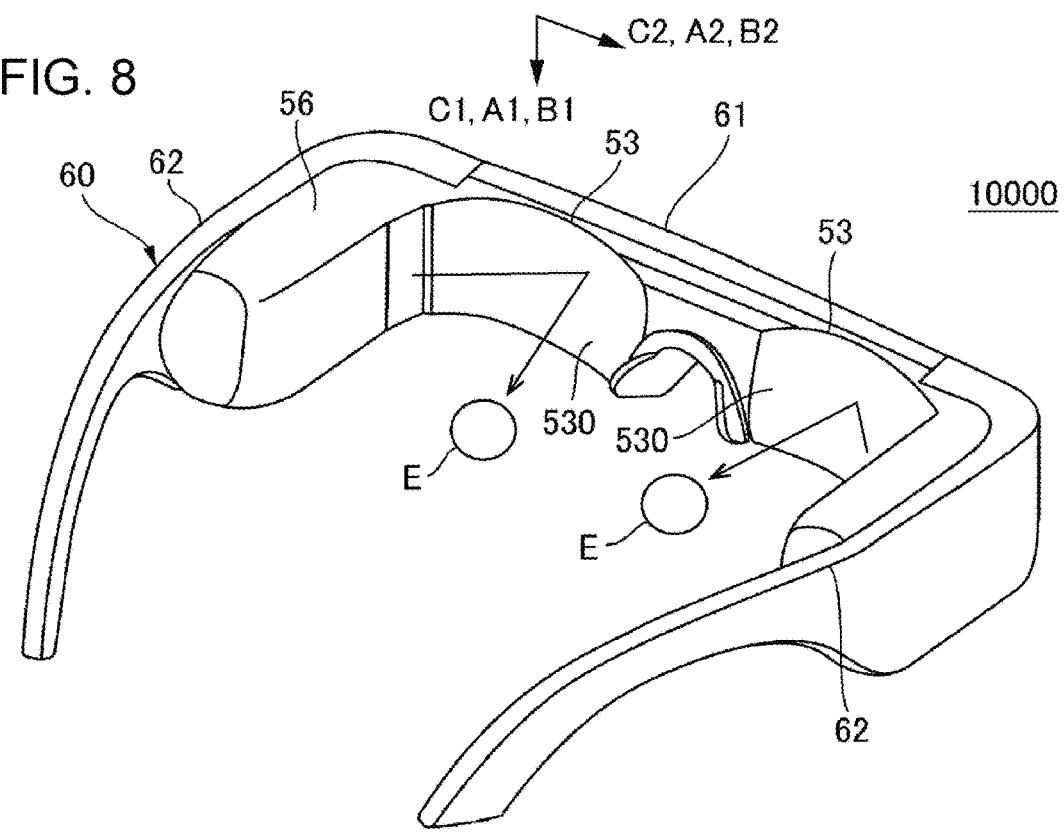
FIG. 8 is an explanatory diagram which is an aspect of the external appearance of the first configuration example of the display apparatus to which the embodiment is applied.

FIG. 7 is an explanatory diagram of a configuration of an optical system in the first configuration example of a display apparatus 10000 to which the embodiment is applied. FIG. 8 is an explanatory diagram which illustrates an aspect of the external appearance of the first configuration example of the display apparatus 10000 to which the embodiment is applied.

In FIG. 7, the display apparatus 10000 has a light source portion 51 which emits light flux for displaying an image, a scanning optical system 20 which is provided with a scanning mirror 24 which makes an image by scanning the light flux which is emitted from the light source portion 51, and an optical guiding system 52 which makes light flux La which is scanned by the scanning optical system 20 incident to the eyes E of the user and, in the present embodiment, the optical guiding system 52 has a relay lens system 54, a projection lens system 55, and a reflective member 53 on the emission side from the scanning optical system 20. The relay lens system 54 is formed by, for example, two lenses 541 and 542. In the present embodiment, the relay lens system 54 is formed by an afocal optical system.

The light source portion 51 emits light source light before the optical modulation or modulated light subjected to optical modulation. In the present embodiment, the light source portion 51 is formed as a modulated radiation emitting portion which emits the modulated radiation subjected to optical modulation. In more detail, the light source portion 51 has a red laser element 511(R) which emits red light (R), a green laser element 511(G) which emits green light (G), and a blue laser element 511(B) which emits blue light (B) as the light source and has two half mirrors 512 and 513 which synthesize the light path of these laser elements. The red laser element 511(R), the green laser element 511(G), and the blue laser element 511(B) emit light flux which is modulated to a light intensity which corresponds to each dot of an image to be displayed under the control of a control portion 59.

The scanning optical system 20 scans the incident light in a first scanning direction A1 and a second scanning direction A2 which intersects with the first scanning direction A1 and the scanned light flux La is projected on the reflective member 53 via the relay lens system 54 and the projection lens system 55. The operation of the scanning optical system 20 is also carried out under the control of the control portion 59. It is possible to realize the scanning optical system 20, for example, through a micro mirror device which is formed using micro electro mechanical systems (MEMS) technology using a silicon substrate and the like.

In the present embodiment, the display apparatus 10000 is formed as a projection type display apparatus of a retina scanning type. For this reason, the reflective member 53 is provided with a reflection surface 530 with a concave curved surface form which reflects the projected light flux La and makes this light flux incident to the eyes E of the user as the light flux La. In the display apparatus 10000, the light flux La which is scanned in the first scanning direction A1 and the second scanning direction A2 which intersects with respect to the first scanning direction A1 using the scanning optical system 20 is reflected on the reflection surface 530 of the reflective member 53 in a first incident direction C1 which corresponds to the first scanning direction A1 and a second incident direction C2 which corresponds to the second scanning direction A2 and reaches a retina E2 via a pupil E1. Accordingly, it is possible to make the user recognize an image. In the present embodiment, the reflective member 53 is a combiner with a partial transmission reflection property. For this reason, since external light is also incident to the eyes via the reflective member 53 (the combiner), it is possible for the user to recognize an image in which the image which is formed by the display apparatus 10000 and the external light (the background) are superimposed.

In the display apparatus 10000 of the present embodiment, a pupil expansion element 10a which will be described below is arranged in the light path which covers from the scanning optical system 20 to the reflective member 53 (the light path which covers from the scanning optical system 20 to the optical guiding system 52 or the light path of the optical guiding system 52). The pupil expansion element 10a expands the light flux which is emitted from the scanning optical system 20 in at least one of a first expansion direction B1 which corresponds to the first scanning direction A1 (the first incident direction C1) and a second expansion direction B2 which corresponds to the second scanning direction A2 (the second incident direction C2). In the present embodiment, the pupil expansion element 10a expands the light flux which is emitted from the scanning optical system 20 in both the first expansion direction B1 which corresponds to the first scanning direction A1 (the first incident direction C1) and the second expansion direction B2 which corresponds to the second scanning direction A2 (the second incident direction C2).

In the present embodiment, the pupil expansion element 10a may be arranged in either the light path which covers from the scanning optical system 20 to the optical guiding system 52 or the light path of the optical guiding system 52, but is arranged in the light path of the optical guiding system 52 in the present embodiment. In more detail, the pupil expansion element 10a is arranged between the lens 542 on the emission side of the relay lens system 54 and the projection lens system 55 in the light path of the optical guiding system 52. In addition, the scanning mirror 24 of the scanning optical system 20 is arranged at the position of the incident pupil of an optical system 57 which is formed by the pupil expansion element 10a and the relay lens system 54 and a final emission surface of the pupil expansion element 10a is arranged at the position of the emission pupil of the optical system 57.

In the display apparatus 10000 which is formed in this manner, the light flux La (laser beam) which is scanned by the scanning mirror 24 is incident to the pupil expansion element 10a via the relay lens system 54 and the light flux La1 of which the light flux diameter is expanded by the pupil expansion element 10a is incident to the projection lens system 55. Here, the relay lens system 54 is an afocal optical system for emitting the light flux which is parallel light, as parallel light. Accordingly, since it is possible to see that light flux La1 of which the light flux diameter is expanded by the pupil expansion element 10a is scanned with a point in which the emission surface of the pupil expansion element 10a and the optical axis cross as a center, it is possible to miniaturize the pupil expansion element 10a and the projection lens system 55.

In a case of configuring the display apparatus 10000 of the present embodiment as a see through-type head-mounted display (an eye glass display), as shown in FIG. 8, the display apparatus 10000 is formed in a shape such as glasses. In addition, in a case of making the modulated radiation incident to each of the left and right eyes E of an observer, the display apparatus 10000 has the reflective member 53 for a left eye and a frame 60 which supports the reflective member 53 for a left eye by a front portion 61 and an optical unit 56 which includes optical portions which are described with reference to FIG. 7 is provided at each of left and right temples 62 of the frame 60. Here, the light source portion 51, the scanning optical system 20, the relay lens system 54, the pupil expansion element 10a, and the projection lens system 55 may all be provided in the optical unit 56 and only the scanning optical system 20, the relay lens system 54, the pupil expansion element 10a, and the projection lens system 55 may be provided in the optical unit 56, and the optical unit 56 and the light source portion 51 may be connected by an optical cable or the like.

In the display apparatus 10000 of the present embodiment, in the image recognized by the user, the second incident direction C2 of the light flux La from the reflective member 53 corresponds to the horizontal direction in which both eyes are lined up and accordingly, the second scanning direction A2 in the scanning optical system 20 and the second expansion direction B2 in the pupil expansion element 10a correspond to the horizontal direction of the image. In addition, the first incident direction C1 of the light flux La from the reflective member 53 corresponds to the vertical direction which intersects with respect to the horizontal direction in which both eyes are lined up and accordingly, the first scanning direction A1 in the scanning optical system 20 and the first expansion direction B1 in the pupil expansion element 10a correspond to the vertical direction of the image.

Configuration Example 1 of Pupil Expansion Element 10a

Figure 9:
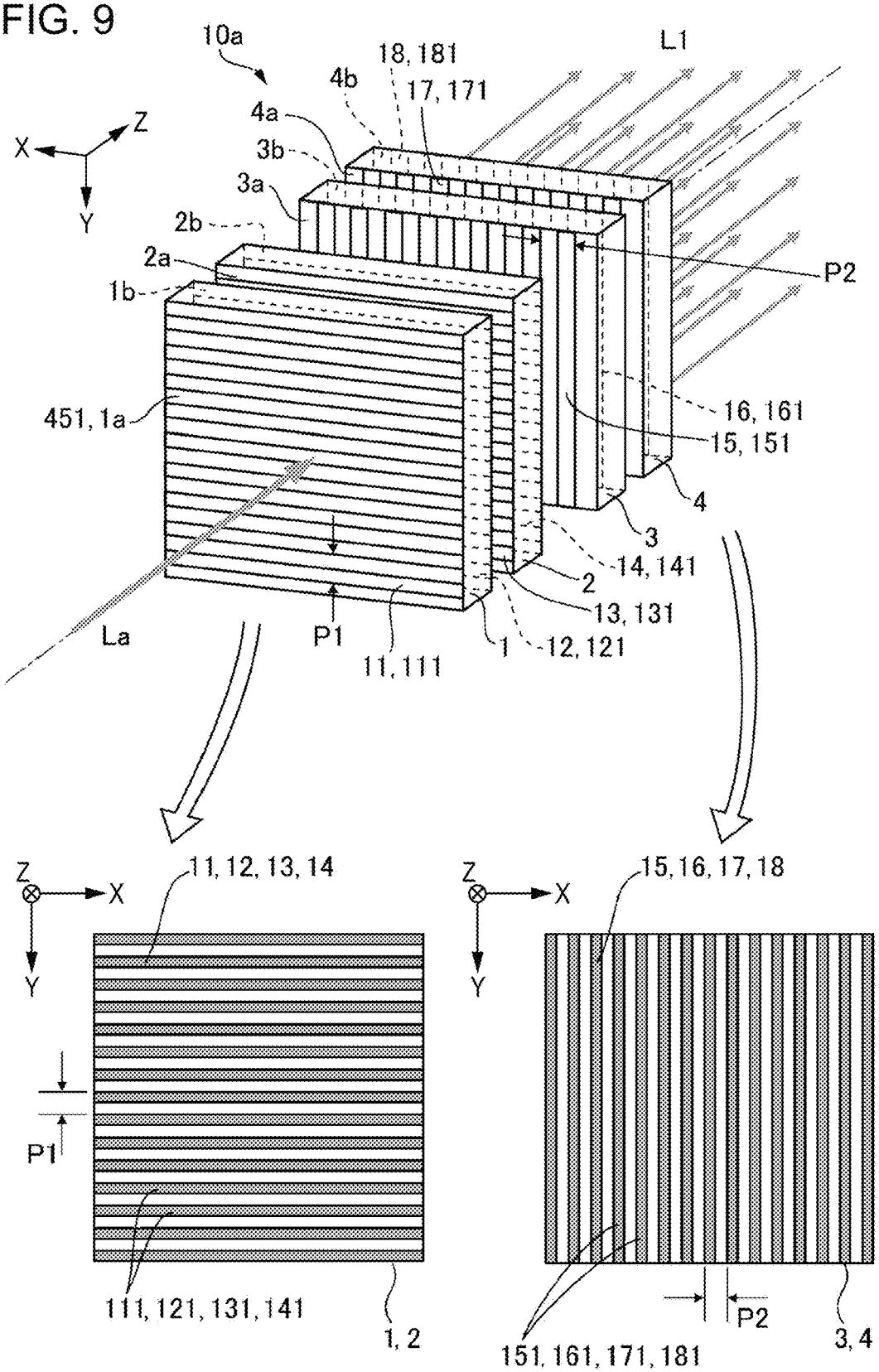
FIG. 9 is an explanatory diagram which is an aspect of configuration example 1 of a pupil expansion element which is used for the display apparatus which is illustrated in FIG. 7 and FIG. 8.
Figure 10:
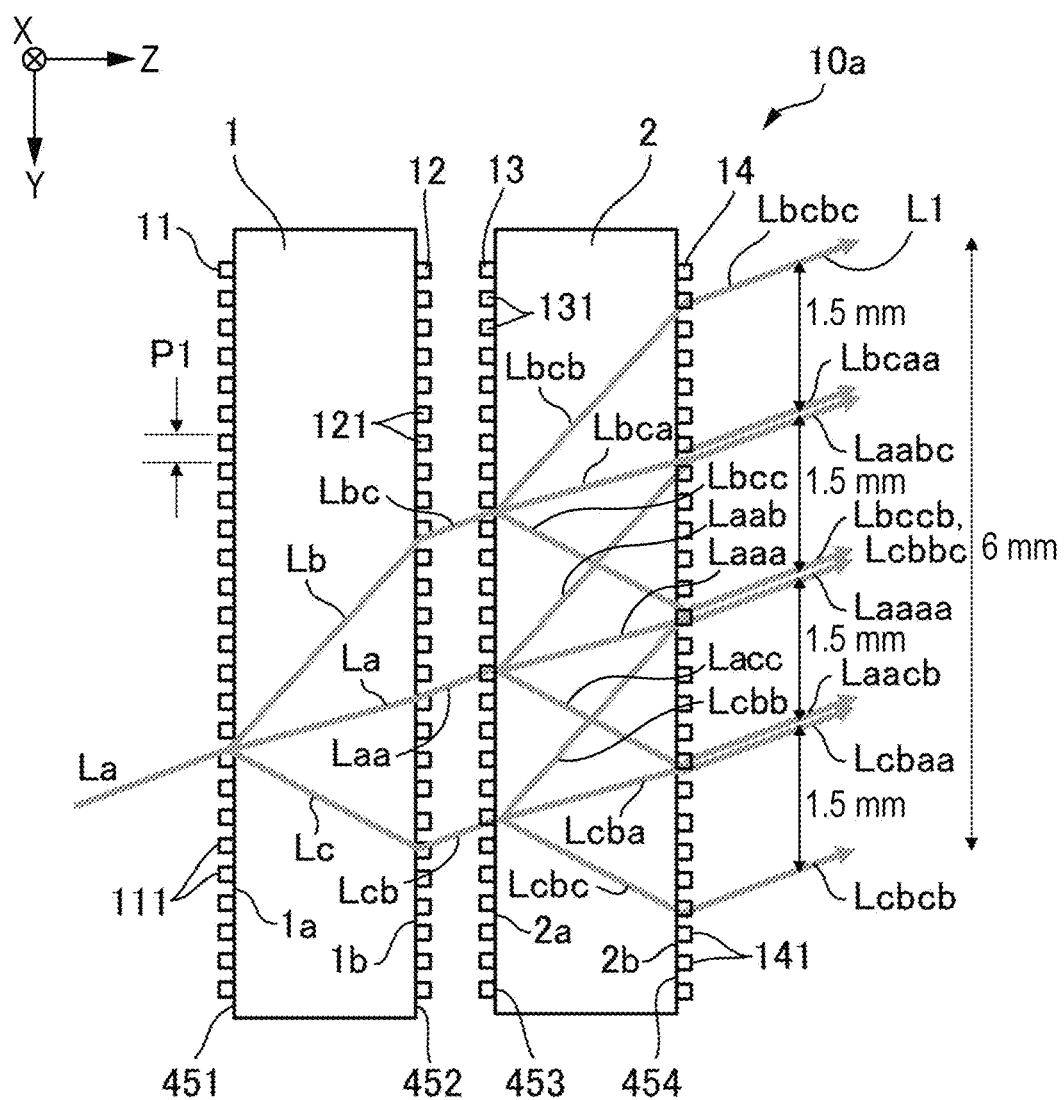
FIG. 10 is an explanatory diagram of a state in which light flux is expanded in the pupil expansion element which is illustrated in FIG. 9.

FIG. 9 is an explanatory diagram which illustrates an aspect of configuration example 1 of the pupil expansion element 10a which is used for the display apparatus 10000 which is illustrated in FIG. 7 and FIG. 8. FIG. 10 is an explanatory diagram of a state which expands light flux in the pupil expansion element 10a which is illustrated in FIG. 9. Here, FIG. 10 only illustrates a light beam which is emitted from the pupil expansion element 10a as parallel light. In addition, in the description below, description will be given by setting two directions which are orthogonal to each other as an X direction and a Y direction within the plane on which the diffraction gratings are formed and within the plane which intersects with an optical axis which extends in a Z direction. Here, for example, the X direction corresponds to the first expansion direction B1 (the vertical direction) shown in FIG. 7 and FIG. 8 and the Y direction corresponds to the second expansion direction B2 (the horizontal direction) shown in FIG. 1.

As shown in FIG. 9, the pupil expansion element 10a has a configuration in which diffraction gratings 11 to 18 are formed on each surface of four translucent members 1, 2, 3, and 4 which are arranged in parallel along an optical axis L. In more detail, the pupil expansion element 10a has the diffraction grating 11 which is provided with a grating 111 which is formed by convex portions which extend in a straight line in the X direction on one surface 1a of the translucent member 1 and the diffraction grating 12 which is provided with a grating 121 which is formed by convex portions which extend in a straight line in the X direction on another surface 1b of the translucent member 1. In addition, the pupil expansion element 10a is provided with the diffraction grating 13 which is provided with a grating 131 which is formed by convex portions which extend in a straight line in the X direction on one surface 2a of the translucent member 2 which is opposed to the other surface 1b of the translucent member 1 and the diffraction grating 14 which is provided with a grating 141 which is formed by convex portions which extend in a straight line in the X direction on the other surface 2b of the translucent member 2. The grating periods of the gratings 111 and 121 are the same and the diffraction angles of the diffraction gratings 11 and 12 are matched. In addition, the grating periods of the gratings 131 and 141 are the same and the diffraction angles of the diffraction gratings 11 and 12 are matched. In the present embodiment, grating periods P1 of the gratings 111, 121, 131, and 141 are the same and the diffraction angles of the diffraction gratings 11, 12, 13, and 14 are matched.

In addition, the pupil expansion element 10a has the diffraction grating 15 which is provided with a grating 151 which is formed by convex portions which extend in a straight line in the Y direction on one surface 3a of the translucent member 3 which is opposed to the other surface 2b of the translucent member 2 and the diffraction grating 16 which is provided with a grating 161 which is formed by convex portions which extend in a straight line in the Y direction on the other surface 3b of the translucent member 3. In addition, the pupil expansion element 10a is provided with the diffraction grating 17 which is provided with a grating 171 which is formed by convex portions which extend in a straight line in the Y direction on one surface 4a of the translucent member 4 which is opposed to the other surface 3b of the translucent member 3 and the diffraction grating 18 which is provided with a grating 181 which is formed by convex portions which extend in a straight line in the Y direction on the other surface 4b of the translucent member 4. The grating periods of the gratings 151 and 161 are the same and the diffraction angles of the diffraction gratings 15 and 16 are matched. In addition, the grating periods of the gratings 171 and 181 are the same and the diffraction angles of the diffraction gratings 17 and 18 are matched. In the present embodiment, grating periods P2 of the gratings 151, 161, 171, and 181 are the same and the diffraction angles of the diffraction gratings 15, 16, 17, and 18 are matched.

In the pupil expansion element 10a which is formed in this manner, as shown in FIG. 10, when the light flux La is incident to the diffraction grating 11, 0 order diffraction light La, +1 order diffraction light Lb, and −1 order diffraction light Lc are generated and the diffraction light is incident to the diffraction grating 12. Accordingly, in the diffraction grating 12, 0 order diffraction light Laa, +1 order diffraction light (which is not shown in the diagram), and −1 order diffraction light (which is not shown in the diagram) are generated from the 0 order diffraction light La, 0 order diffraction light (which is not shown in the diagram), +1 order diffraction light (which is not shown in the diagram), and −1 order diffraction light Lbc are generated from the +1 order diffraction light Lb, 0 order diffraction light (which is not shown in the diagram), +1 order diffraction light Lcb, and −1 order diffraction light (which is not shown in the diagram) are generated from the −1 order diffraction light Lc, and the diffraction light is incident to the diffraction grating 13. Accordingly, in the diffraction grating 13, 0 order diffraction light Laaa, +1 order diffraction light Laab, and −1 order diffraction light Laac are generated from the 0 order diffraction light Laa, 0 order diffraction light Lbca, +1 order diffraction light Lbcb, and −1 order diffraction light Lbcc are generated from the −1 order diffraction light Lbc, 0 order diffraction light Lcba, +1 order diffraction light Lcbb, and −1 order diffraction light Lcbc are generated from the +1 order diffraction light Lcb, and the diffraction light is incident to the diffraction grating 14.

As the result, −1 order diffraction light Lbcbc which is generated from the +1 order diffraction light Lbcb is emitted from the diffraction grating 14. In addition, 0 order diffraction light Lbcaa which is generated from the 0 order diffraction light Lbca and −1 order diffraction light Laabc which is generated from the +1 order diffraction light Laab are overlapped and emitted from the diffraction grating 14. In addition, +1 order diffraction light Lbccb which is generated from the −1 order diffraction light Lbcc, 0 order diffraction light Laaaa which is generated from the 0 order diffraction light Laaa, and −1 order diffraction light Lcbbc which is generated from the +1 order diffraction light Lcbb are overlapped and emitted from the diffraction grating 14. In addition, +1 order diffraction light Laacb which is generated from the −1 order diffraction light Laac and 0 order diffraction light Lcbaa which is generated from the 0 order diffraction light Lcba are overlapped and emitted from the diffraction grating 14. In addition, +1 order diffraction light Lcbcb which is generated from the −1 order diffraction light Lcbc is emitted from the diffraction grating 14.

Here, the −1 order diffraction light Lbcbc, the +1 order diffraction light Lbcaa (the −1 order diffraction light Laabc), the +1 order diffraction light Lbccb (the 0 order diffraction light Laaaa and the −1 order diffraction light Lcbbc), the +1 order diffraction light Laacb (the 0 order diffraction light Lcbaa), and the +1 order diffraction light Lcbcb are light which proceeds in parallel with each other from 6 places which are separated in the Y direction and the light flux La is emitted as light flux La1 of which the diameter is expanded in the Y direction. For example, each of the diffraction lights is a light which proceeds in parallel with the others from 6 places which are separated by 1.5 mm in the Y direction and the light flux La is emitted as the light flux La1 of which the diameter is expanded by 6 mm in the Y direction. Accordingly, it is possible to see an image even when the pupil E1 shown in FIG. 7 moves in the Y direction. In addition, due to the diffraction gratings 15, 16, 17, and 18, the light flux La is emitted as the light flux La1 of which the diameter is expanded in the X direction. Accordingly, it is possible to see an image even when the pupil E1 shown in FIG. 7 moves in the X direction.

Configuration Example 2 of Pupil Expansion Element 10a

Figure 11:
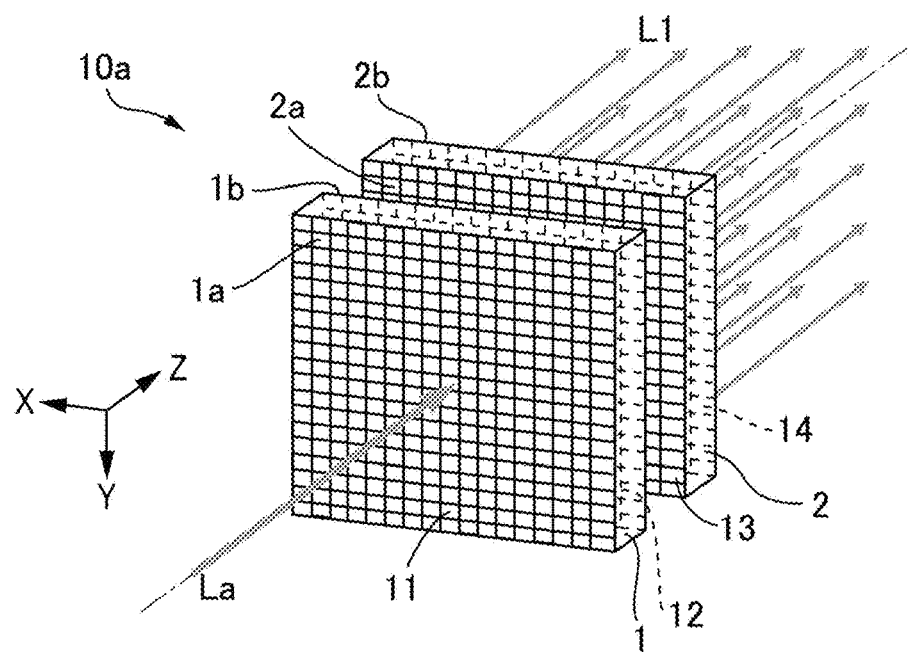
FIG. 11 is an explanatory diagram which illustrates an aspect of configuration example 2 of the pupil expansion element which is used for the display apparatus which is illustrated in FIG. 7 and FIG. 8.
Figure 12:
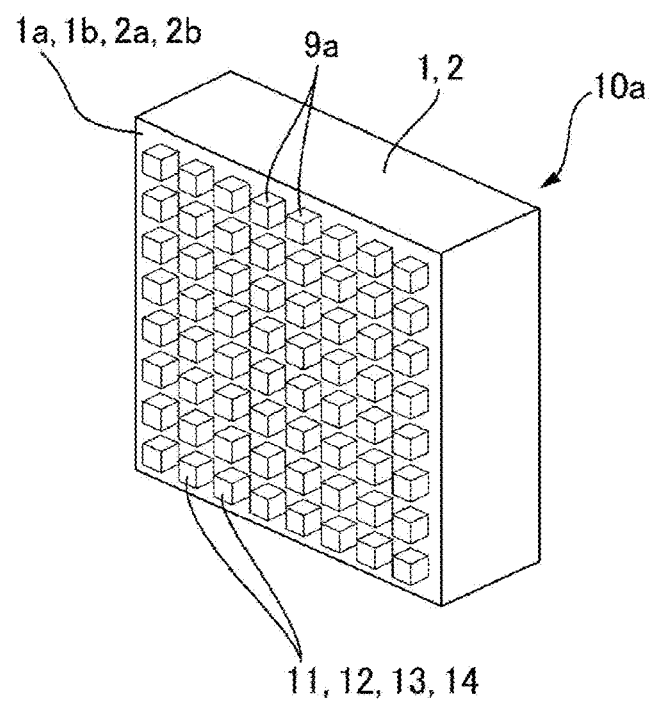
FIG. 12 is an explanatory diagram of a diffraction grating of the pupil expansion element which is illustrated in FIG. 11.

FIG. 11 is an explanatory diagram which illustrates an aspect of a configuration example 2 of the pupil expansion element 10a which is used for the display apparatus 10000 which is illustrated in FIG. 7 and FIG. 8. FIG. 12 is an explanatory diagram of a diffraction grating of the pupil expansion element which is illustrated in FIG. 11.

As shown in FIG. 11, in the same manner as the configuration example shown in FIG. 9, diffraction gratings are formed on each surface of a plurality of translucent members which are arranged in parallel along the optical axis L also in the pupil expansion element 10a of the present embodiment. However, in the present embodiment, the diffraction gratings 11, 12, 13, and 14 are formed on each of the 4 surfaces of the two translucent members 1 and 2 which are arranged in parallel along the optical axis L and the pupil expansion element 10a expands the light flux La in the X direction and the Y direction using the 4 diffraction gratings 11, 12, 13, and 14.

In more detail, as shown in FIG. 12, in each of one surface 1a of the translucent member 1, the other surface 1b of the translucent member 1, one surface 2a of the translucent member 2, and the other surface 2b of the translucent member 2, the diffraction gratings 11, 12, 13, and 14 are formed by convex portions 9a which are formed in a plurality of positions at equal intervals in the X direction (the same period) and at equal intervals in the Y direction (the same period). Here, although the diagram is omitted, the diffraction gratings 11, 12, 13, and 14 may be formed by the concave portions which are formed in a plurality of positions at equal intervals in the X direction (the same period) and at equal intervals in the Y direction (the same period).

Application Example of the Embodiment for Pupil Expansion Element 10a

In the embodiment, when configuring the pupil expansion element 10a, it is possible to use the optical element 1000 which is described with reference to FIG. 1 to FIG. 6.

For example, when configuring the diffraction gratings 11 and 12 of the pupil expansion element 10a which is described with reference to FIG. 9, FIG. 10, FIG. 11, and FIG. 12, it is possible to use the optical element 1000 of Embodiment 1 which is described with reference to FIG. 1. In this case, the diffraction grating 11 is equivalent to the first diffraction grating 710 and the diffraction grating 12 is equivalent to the second diffraction grating 720. The translucent member 1 is equivalent to the first substrate 100, the first filler 971, and the second substrate 200. The same applies to the cases of configuring the other diffraction gratings 13, 14, 15, 16, 17, and 18.

In addition, when configuring the diffraction gratings 11, 12, 13, and 14 of the pupil expansion element 10a which is described with reference to FIG. 9, FIG. 10, FIG. 11, and FIG. 12, it is possible to use the optical element 1000 of Embodiment 2 which is described with reference to FIG. 4. In this case, the diffraction grating 11 is equivalent to the first diffraction grating 710 and the diffraction grating 12 is equivalent to the second diffraction grating 720. The translucent member 1 is equivalent to the first substrate 100, the first filler 971, and the second substrate 200. In addition, the diffraction grating 13 is equivalent to the third diffraction grating 730 and the diffraction grating 14 is equivalent to the fourth diffraction grating 740. The translucent member 2 is equivalent to the third substrate 300, the second filler 972, and the fourth substrate 400. The same applies to the cases of configuring the other diffraction gratings 15, 16, 17, and 18.

In addition, when configuring the diffraction gratings 11, 12, 13, and 14 of the pupil expansion element 10a which is described with reference to FIG. 9, FIG. 10, FIG. 11, and FIG. 12, it is possible to use the optical element 1000 of Embodiment 2 which is described with reference to FIG. 6. In this case, the diffraction grating 11 is equivalent to the first diffraction grating 711 on the incident side, the diffraction grating 12 is equivalent to the first diffraction grating 712 on the emission side, the diffraction grating 13 is equivalent to the second diffraction grating 721 on the incident side, and the diffraction grating 14 is equivalent to the second diffraction grating 722 on the emission side. The translucent member 1 is equivalent to the first substrate 100, the first filler 971, and the second substrate 200. The same applies to the cases of configuring the other diffraction gratings 15, 16, 17, and 18.

Second Configuration Example of Display Apparatus

Figure 13:
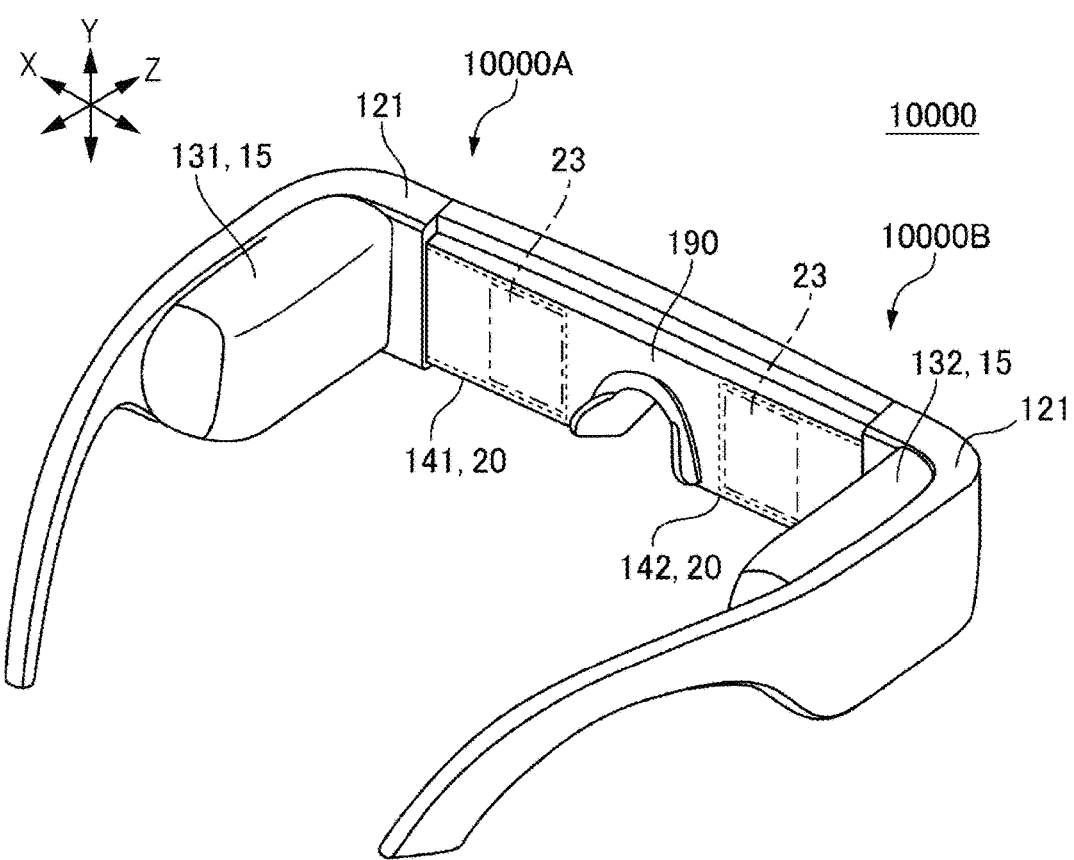
FIG. 13 is an explanatory diagram which illustrates an aspect of the external appearance of the second configuration example of the display apparatus to which the embodiment is applied.
Figure 14:
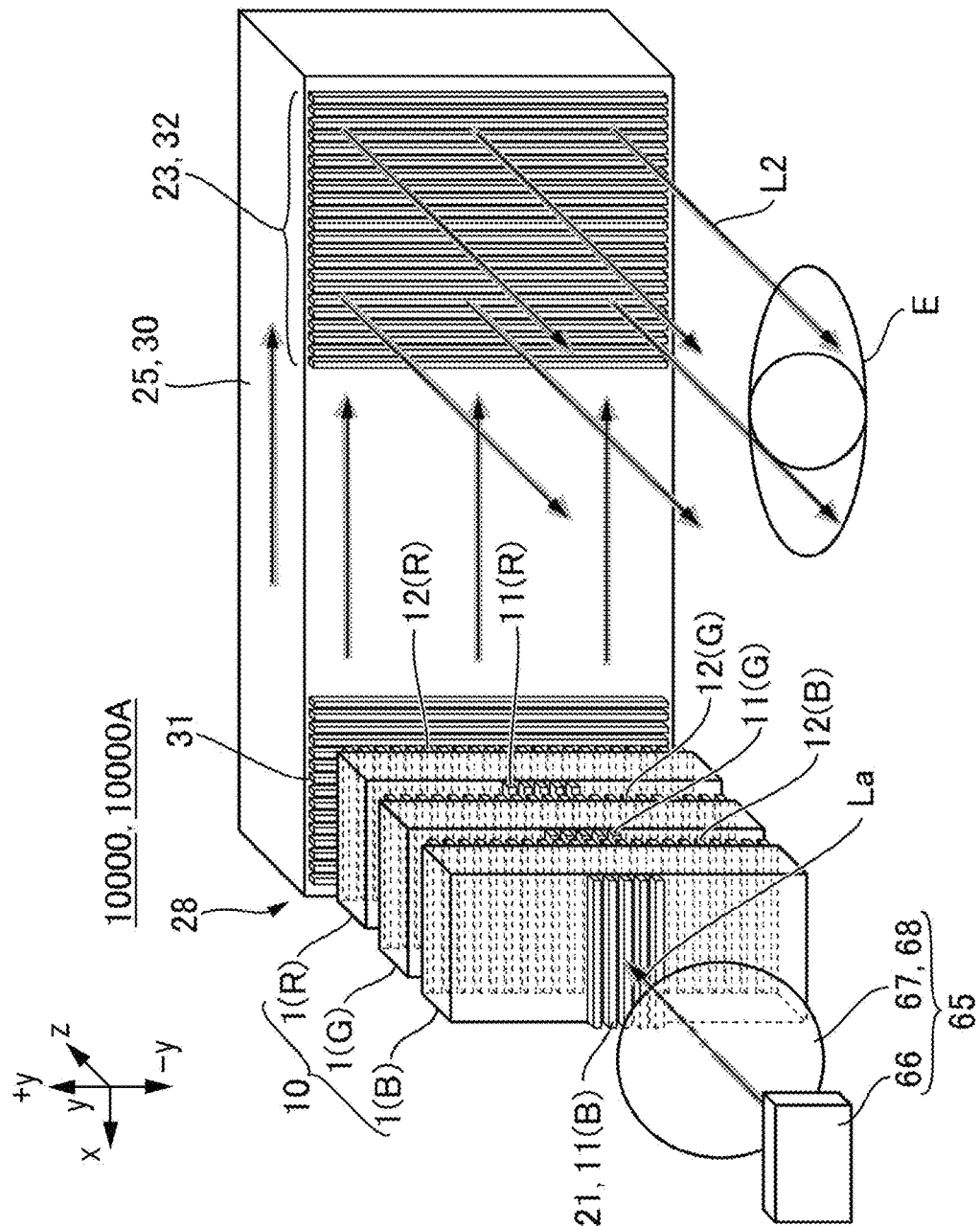
FIG. 14 is an explanatory diagram of a configuration of an optical system in the second configuration example of the display apparatus to which the embodiment is applied.
Figure 15:
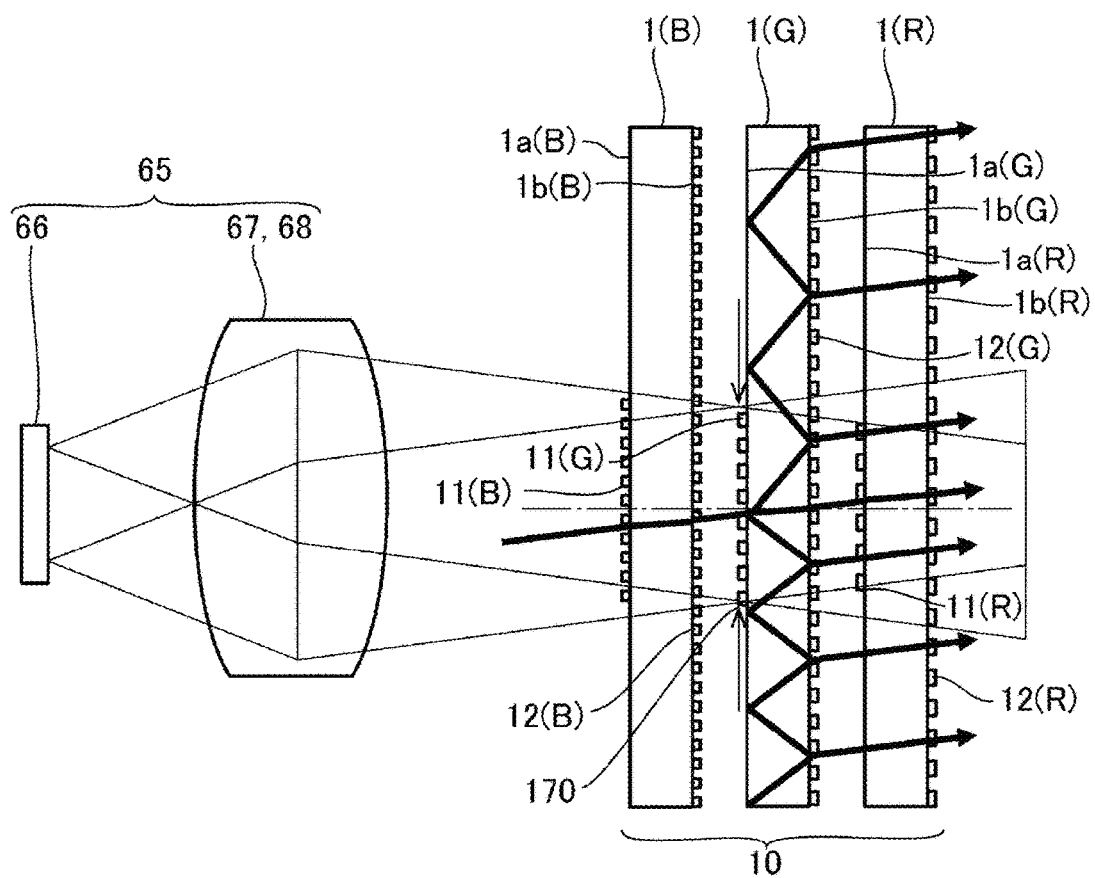
FIG. 15 is an explanatory diagram of the pupil expansion element which is illustrated in FIG. 14.
Figure 16:
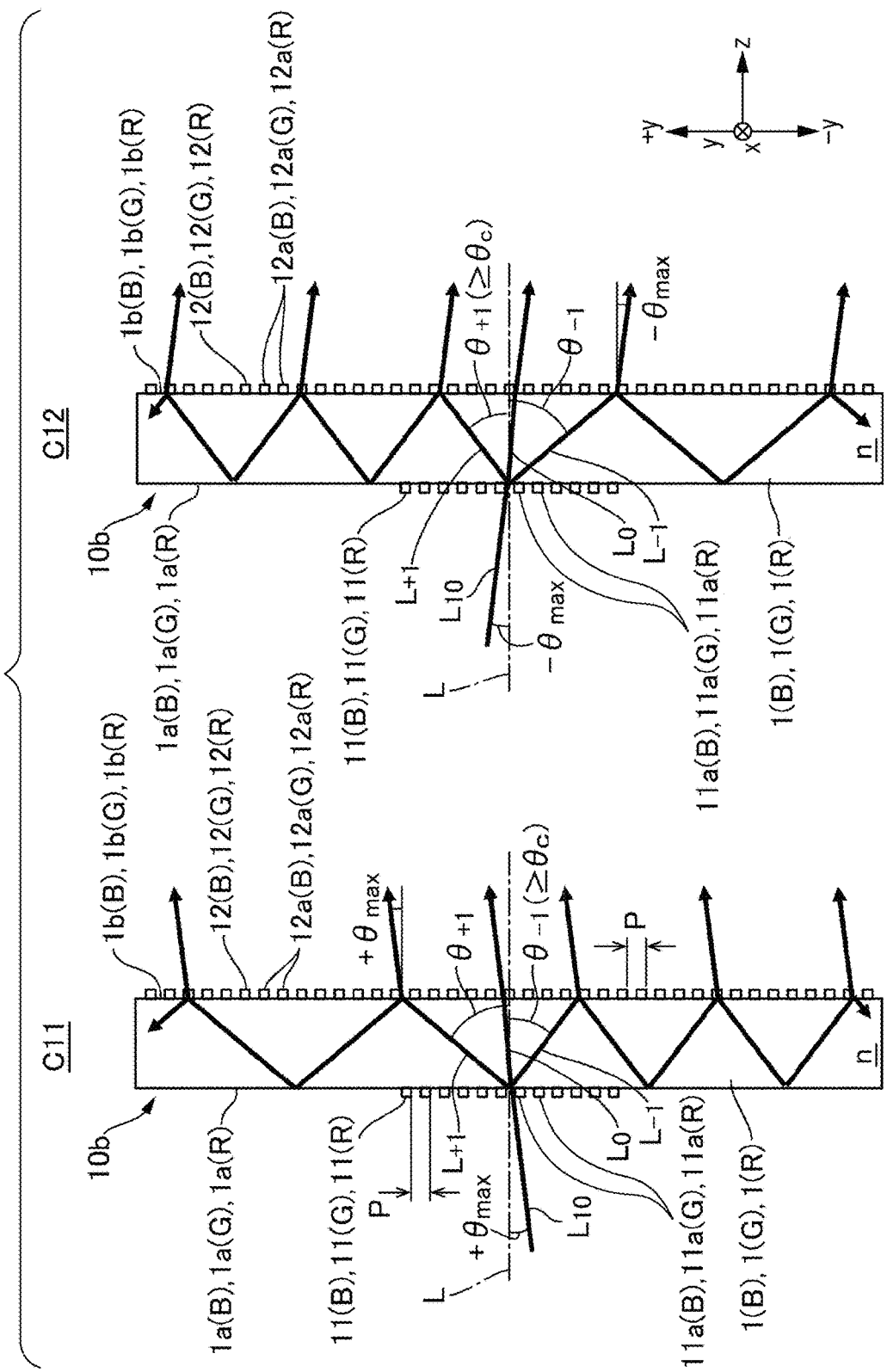
FIG. 16 is a diagram of the light beam of the pupil expansion element which is illustrated in FIG. 14.

FIG. 13 is an explanatory diagram which illustrates an aspect of the external appearance of the second configuration example of the display apparatus 10000 to which the embodiment is applied. FIG. 14 is an explanatory diagram of a configuration of an optical system in the second configuration example of the display apparatus 10000 to which the embodiment is applied. FIG. 15 is an explanatory diagram of a pupil expansion element 10b which is illustrated in FIG. 14. FIG. 16 is a diagram of the light beam of the pupil expansion element 10b which is illustrated in FIG. 14. In the description below, the blue light is equivalent to the first light beam, the green light is equivalent to the second light beam, and the red light is equivalent to the third light beam.

The display apparatus 10000 shown in FIG. 13 is a head-mounted display (a head-mounted display apparatus) which has an external appearance such as glasses. The display apparatus 10000 is able to make an observer wearing the display apparatus 10000 recognize image light and is able to make the observer observe an external image in a see through manner. The display apparatus 10000 is provided with an optical panel 190 which covers the front of the eyes of the observer, a frame 121 which supports the optical panel 190, and a first driving portion 131 and a second driving portion 132 which are provided on the side frame of the frame 121. The optical panel 190 has a first panel portion 141 and a second panel portion 142 and the first panel portion 141 and the second panel portion 142 are plate shaped portions which are linked integrally in the center. A first display apparatus 10000A which is in a combination of the first panel portion 141 and the first driving portion 131 on the left side when facing the diagram is a portion for the left eye and functions as a visual image display apparatus, even when used individually. In addition, a second display apparatus 10000B which is in a combination of the second panel portion 142 and the second driving portion 132 on the right side when facing the diagram is a portion for the right eye and functions a visual image display apparatus, even when used individually. Since the second display apparatus 10000B has the same structure as the first display apparatus 10000A and has a configuration in which the left and right are reversed, in the description below, description of the first display apparatus 10000A will be the focus and detailed description of the second display apparatus 10000B will be omitted.

As shown in FIG. 14, the first display apparatus 10000A is provided with an image light projection apparatus 65 and a light guiding optical apparatus 28 (an optical guiding system). The image light projection apparatus 65 is equivalent to the first driving portion 131 in FIG. 13 and the light guiding optical apparatus 28 is equivalent to the first panel portion 141 in FIG. 13. The image light projection apparatus 65 has an image forming apparatus 66 and a projection optical system 67. The image forming apparatus 66 is omitted in the diagram but has a lighting apparatus which emits two dimensional lighting light, a transmission type liquid crystal display device, and a driving control portion which controls an operation of the lighting apparatus and the liquid crystal display device. The lighting apparatus generates light which includes three colors of red, green, and blue and the liquid crystal display device forms image light which is to be a display target such as a moving image by spatially modulating the lighting light from the lighting apparatus.

In the present embodiment, the projection optical system 67 is provided with a collimator lens 68 which has a power which focuses light of the light beam of the light flux La which is emitted from each point on the image forming apparatus 66 (the liquid crystal display device). Here, a reflection type spatial optical modulator which forms an image by reflecting light from the light source using a mirror such as an MEMS may be used as the image forming apparatus 66. In addition, as described with reference to FIG. 7 and the like, the image forming apparatus 66 may be formed by the scanning optical system 20 which makes an image by scanning the light flux which is emitted from the light source portion 51.

The light guiding optical apparatus 28 is provided with an irradiated region 21 which is irradiated with the light flux La and a display light emission region 23 to which light which is incident from the irradiated region 21 is incident and proceeds to be emitted as display light L2. The light guiding optical apparatus 28 has the pupil expansion element 10b and a light guiding optical system 25 which guides image light L1 which is emitted from the pupil expansion element 10b in the x direction which intersects with the y direction. The light guiding optical system 25 has a light guiding plate 30 which extends in the x direction. The light guiding plate 30 has a diffraction grating 31 which is opposed to the pupil expansion element 10b in the end portion on one side in the x direction and a diffraction grating 32 which is opposed to the eyes E in the end portion on the other side in the x direction and the display light emission region 23 is formed by the diffraction grating 32.

In the present embodiment, in the pupil expansion element 10b, the three light guiding plates (the blue translucent member 1(B), the green translucent member 1(G), and the red translucent member 1(R)) each extend in the vertical direction (the y direction). In addition, in the pupil expansion element 10b, the blue translucent member 1(B), the green translucent member 1(G), and the red translucent member 1(R) are arranged in order along the optical axis L from the incident side of the image light to the emission side. The thickness of the translucent members 1(B), 1(G), and 1(R) is the same.

As shown in FIG. 15, the translucent member 1(B) is provided with one surface 1a(B) and the other surface 1b(B) which is opposed to the surface 1a(B) in parallel. diffraction grating 11(B) in which gratings 11a(B) extend in the x direction is provided on the surface 1a(B) and a diffraction grating 12(B) in which gratings 12a(B) extend in the x direction is provided on the surface 1b(B). The grating directions and the grating periods of the diffraction grating 11(B) and the diffraction grating 12(B) are the same.

The translucent member 1(G) is provided with a surface 1a(G) which is opposed to the surface 1b(B) of the translucent member 1(B) in parallel on the opposite side of the translucent member 1(B), and a surface 1b(G) which is opposed to the surface 1a(G) in parallel on the opposite side of the translucent member 1(B). A diffraction grating 11(G) in which gratings 11a(G) extend in the x direction is provided on the surface 1a(G) and a diffraction grating 12(G) in which gratings 12a(G) extend in the x direction is provided on the surface 1b(G). The grating directions and the grating periods of the diffraction grating 11(G) and the diffraction grating 12(G) are the same. Here, the grating direction of the diffraction grating 11(G) and the diffraction grating 12(G) is the same as that of the diffraction grating 11(B) and the diffraction grating 12(B); however, the grating period is different.

The translucent member 1(R) is provided with a surface 1a(R) which is opposed to the surface 1b(G) of the translucent member 1(G) in parallel on the opposite side of the translucent member 1(B) and a surface 1b(R) which is opposed to the surface 1a(R) in parallel on the opposite side of the translucent member 1(B). A diffraction grating 11(R) in which gratings 11a(R) extend in the x direction is provided on the surface 1a(R) and a diffraction grating 12(R) in which gratings 12a(R) extend in the x direction is provided on the surface 1b(R). The grating directions and the grating periods of the diffraction grating 11(R) and the diffraction grating 12(R) are the same. Here, the grating direction of the diffraction grating 11(R) and the diffraction grating 12(R) is the same as that of the diffraction grating 11(B) and the diffraction grating 12(B); however, the grating period thereof is different from that of the diffraction grating 11(B), the diffraction grating 12(B), the diffraction grating 11(G), and the diffraction grating 12(G).

Accordingly, the light flux La which is emitted from the image light projection apparatus 65 is incident to the pupil expansion element 10b and, after the light flux diameter is expanded in the y direction by the pupil expansion element 10b, the light flux La is emitted to the diffraction grating 31 of the light guiding plate 30. Then, the light which is incident from the diffraction grating 31 of the light guiding plate 30 is transmitted within the light guiding plate 30 in the x direction and the pupil is expanded in the x direction while being emitted towards the eyes E from the diffraction grating 32 of the light guiding plate 30. At this time, 0 order diffraction light $L_0$ is also generated; however, since the light does not contribute to the pupil expansion, the 0 order diffraction efficiency is preferably low.

In addition, as shown in FIG. 16, in the pupil expansion element 10b of the present embodiment, for example, as shown for the light beam in the translucent member 1(G), a plurality of lights which are emitted at the same angle as the incident angle are generated in both directions. In order to do this, it is necessary that both +1 order diffraction light $L_{+1}$ which is transmitted in the +y direction and −1 order diffraction light $L_{-1}$ which is transmitted in the −y direction are transmitted within the translucent members 1(B), 1(G), and 1(R) at full reflection. For this, both of the diffraction angles of the +1 order diffraction light $L_{+1}$ and the −1 order diffraction light $L_{-1}$ are to be larger than a critical angle which is determined by a refractive index n of the translucent members 1(B), 1(G), and 1(R). At this time, as shown in a case 11 in FIG. 16, the diffraction angle of the −1 order diffraction light $L_{-1}$ becomes small in the light beam L10 which is incident at the incident angle of +θ max in any of the translucent members 1(B), 1(G), and 1(R). Accordingly, when the absolute value of a diffraction angle $\theta_{-1}$ of the −1 order diffraction light $L_{-1}$ larger than a critical angle θc, a diffraction angle $\theta_{+1}$ of the +1 order diffraction light $L_{+1}$ is always larger than the critical angle θc. In addition, in a case where the grating period P is constant, the diffraction angle depends on the wavelength of the incident light and the diffraction angle is smaller as the wavelength is shorter. Accordingly, in the spectrum of the image light which transmits the translucent member 1, when the absolute value of the diffraction angle $\theta_{-1}$ of the −1 order diffraction light $L_{-1}$ with respect to a wavelength λc which effectively contributes to the image display and which is the shortest is larger than the critical angle θc, it is possible to transmit the light in both directions of the +y direction and the −y direction over the entire area of the spectrum of the image light.

In contrast to this, in the case C12 which the incident angle of the image light is −θ max, when the incident angle is changed from +θ max to −θ max, the diffraction angle $\theta_{-1}$ of the −1 order diffraction light $L_{-1}$ becomes gradually larger in the minus direction and the transmission in the −y direction is maintained due to the full reflection. In contrast to this, the diffraction angle $\theta_{+1}$ of the +1 order diffraction light $L_{+1}$ becomes gradually smaller; however, since the arrangement of the translucent members 1(B), 1(G), and 1(R) and the diffraction gratings is symmetrical with respect to the optical axis L, as understood when the case C11 is vertically reversed, the diffraction angle $\theta_{+1}$ is larger than the critical angle θc even when the incident angle is −θ max. Accordingly, the transmission in the +y direction is maintained due to the full reflection.

Description will be given below of the conditions under which it is possible to transmit in both directions of the +y direction and the −y direction at full reflection using a formula. Firstly, when the wavelength of the incident light (the light beam L10) is set as λc, the incident angle as θ max, the refractive index of the translucent members 1(B), 1(G), and 1(R) as n, the diffraction angle of the −1 order diffraction light $L_{-1}$ within the translucent members 1(B), 1(G), and 1(R) as $\theta_{-1}$, the grating period P in which the diffraction angle $\theta_{-1}$ matches the critical angle θc is represented by the following formula.

$P = \lambda c/[\sin(\theta max) + 1]$ Formula (1)

Here, when the grating period P is smaller than the value which is represented by Formula (1), the diffraction angle $\theta_{-1}$ of the −1 order diffraction light $L_{-1}$ is larger than the critical angle θc. Accordingly, in order to transmit the image light (the light beam L10) which is incident to the diffraction gratings 11(B), 11(G), and 11(R) in both directions of the +y direction and −y direction at full reflection, it is sufficient if the following conditional formula is satisfied.

$P \leq \lambda c/[\sin(\theta max) + 1]$ Formula (2)

On the other hand, when the grating period P is determined, the diffraction angle θm (m is the number of the diffraction order) according to the diffraction gratings 11(B), 11(G), and 11(R) is obtained by the following formula when the incident wavelength is λ and the incident angle is θi.

$\theta m = \sin^{-1}\{[\sin(\theta i) + m(\lambda/P)]/N\}$ Formula (3)

In the present embodiment, a grating period P1 of the diffraction grating 11(B) and the diffraction grating 12(B), a grating period P2 of the diffraction grating 11(G) and the diffraction grating 12(G), and a grating period P3 of the diffraction grating 11(R) and the diffraction grating 12(R) satisfy the following relationship.

P1<P2<P3

In addition, a grating height H11 of the diffraction grating 11(B), a grating height H12 of the diffraction grating 12(B), a grating height H21 of the diffraction grating 11(G), a grating height H22 of the diffraction grating 12(G), a grating height H31 of the diffraction grating 11(R), and a grating height H32 of the diffraction grating 12(R) satisfy the following relationship.

H11<H21<H31

H12<H11

H22<H21

H32<H31

H12<H11<H22<H21<H32<H31

In the pupil expansion element 10b of the present embodiment, regarding the blue translucent member 1(B), the grating period P1 of the diffraction grating is set such that both of the +1 order diffraction light $L_{+1}$ and the −1 order diffraction light $L_{-1}$ with respect to the light (blue light (L(B)) in the blue wavelength band of which the incident angle is in the range of ±7° are diffracted at an angle which is larger than the critical angle of the translucent member 1(B) and the diffraction light is transmitted within the translucent member 1(B) from the incident position in both directions of the +y direction and the −y direction.

In more detail, the grating period P1 of the diffraction grating 11(B) and the diffraction grating 12(B) of the blue translucent member 1(B) is set to be 0.401 μm such that the 1 order diffraction angle of the shortest wavelength (λc=0.45 μm) in the wavelength band of the blue light L(B) is equal to the critical angle (37.6°) of the translucent member 1B, (refractive index=1.64).

In addition, the grating height H11 of the diffraction grating 11(B) of the blue translucent member 1(B) is set such that the 1 order diffraction efficiency is high in the range from the shortest wavelength (λcb=0.45 μm) in the wavelength band of the blue light L(B) to the longest wavelength (0.47 μm). In addition, the grating height H11 of the diffraction grating 11(B) is a height in which the 1 order diffraction efficiency is high with respect to the blue light L(B) of a wavelength 0.46 μm which is incident orthogonally and the diffraction efficiency is low with respect to the green light L(G) or the red light L(R) which is incident orthogonally. In the present embodiment, the grating height H11 of the diffraction grating 11(B) is, for example, approximately 0.57 μm. In addition, in the diffraction grating 12(B), the light which is transmitted through the translucent member 1(B) is emitted after being divided a plurality of times. For this reason, when the 1 order diffraction efficiency is high in the diffraction grating 12(B), a large amount of light is taken out in the first emission and the light amount is greatly attenuated from the next time. Accordingly, the 1 order diffraction efficiency of the diffraction grating 12(B) is preferably lower than the 1 order diffraction efficiency of the diffraction grating 11(B). For this reason, in the present embodiment, the grating height H12 of the diffraction grating 12 is lower than approximately 0.57 μm. Therefore, it is possible to optimize the light amount distribution which is emitted from the diffraction grating 12(B).

In the blue translucent member 1(B) which is formed in this manner, since the grating periods P1 of the diffraction grating 11(B) and the diffraction grating 12(B) is equal, the light beam which is transmitted within the translucent member 1(B) at full reflection to reach the diffraction grating 12(B) is emitted at the same angle as the incident angle. In other words, light which is emitted at the same angle as the incident angle is reproduced. Here, the green light L(G) and the red light L(R) are also incident to the blue translucent member 1(B) at the same angle as blue light L(B); however, since the wavelengths thereof are longer than the blue light L(B), the green light L(G) and the red light (R) are diffracted at a larger angle than the blue light L(B).

The blue light L(B), the green light L(G), and the red light L(R) which are emitted from the blue translucent member 1(B) are incident to the diffraction grating 11(G) of the green translucent member 1(G) at the same incident angle as the incident angle with respect to the blue translucent member 1(B). Regarding the green translucent member 1(G), the grating period P2 of the diffraction grating is set such that both of the +1 order diffraction light and the −1 order diffraction light with respect to the light in the green wavelength band of which the incident angle is in the range of ±7° are diffracted at a larger angle than the critical angle of the translucent member 1(G) and the diffraction light is transmitted within the translucent member 1(G) from the incident position in both directions of the +y direction and the −y direction.

In more detail, the grating period P2 of the diffraction grating 11(G) and the diffraction grating 12(G) of the green translucent member 1(G) is set to be 0.464 μm such that the 1 order diffraction angle of the shortest wavelength ($\lambda cg$=0.52 μm) in the wavelength band of the green light L(G) is equal to the critical angle (37.6°) of the light guiding plate (refractive index=1.64).

In addition, the grating height H21 of the diffraction grating 11(G) of the green translucent member 1(G) is set such that the 1 order diffraction efficiency is high in the range from the shortest wavelength ($\lambda cg$=0.52 μm) in the wavelength band of the green light L(G) to the longest wavelength (0.54 μm). In the present embodiment, the grating height H21 of the diffraction grating 11(G) is a height such that the 1 order diffraction efficiency is high with respect to the green light L(G) of the wavelength 0.52 μm which is incident orthogonally and the diffraction efficiency is low with respect to the blue light L(B) or the red light L(R) which is incident orthogonally. In the present embodiment, the grating height H21 of the diffraction grating 11(G) is, for example, approximately 0.60 μm. In addition, since the 1 order diffraction efficiency of the diffraction grating is preferably lower than the 1 order diffraction efficiency of the diffraction grating, the grating height H22 of the diffraction grating 12(R) is lower than approximately 0.60 μm. Therefore, it is possible to optimize the light amount distribution which is emitted from the diffraction grating 12(G).

In the green translucent member 1(G) which is formed in this manner, since the grating periods P2 of the diffraction grating 11(G) and the diffraction grating 12(G) is equal, the light beam which is transmitted within the translucent member 1(G) at full reflection to reach the diffraction grating 12(G) is emitted at the same angle as the incident angle. Accordingly, light which is emitted at the same angle as the incident angle is reproduced.

The blue light L(B), the green light L(G), and the red light L(R) which are emitted from the green translucent member 1(G) are incident to the diffraction grating 11(R) of the red translucent member 1(R) at the same incident angle as the incident angle with respect to the blue translucent member 1(B). Regarding the translucent member 1(R) for red, the grating period of the diffraction grating is set such that both of the +1 order diffraction light and the −1 order diffraction light with respect to the light in the wavelength band of green of which the incident angle is in the range of ±7° are diffracted at a larger angle than the critical angle of the translucent member 1(R) and the diffraction light is transmitted within the translucent member 1(R) from the incident position in both directions of the +y direction and the −y direction.

In more detail, the grating period P3 of the diffraction grating 11(R) and the diffraction grating 12(R) of the red translucent member 1(R) is set to be 0.535 μm such that the 1 order diffraction angle of the shortest wavelength ($\lambda cr$=0.60 μm) in the wavelength band of red light L(R) is equal to the critical angle (37.6°) of the translucent member 1(R) (refractive index=1.64).

In addition, the grating height H31 of the diffraction grating 11(R) of the red translucent member 1(R) is set such that the 1 order diffraction efficiency is high in the range from the shortest wavelength ($\lambda cr$=0.60 μm) in the wavelength band of the red light L(R) to the longest wavelength (0.62 μm). In the present embodiment, the grating height H31 of the diffraction grating 11(R) is a height such that the 1 order diffraction efficiency is high with respect to the red light of the wavelength of 0.60 μm which incident orthogonally and the diffraction efficiency is low with respect to the blue light or the green light which is incident orthogonally. In the present embodiment, the grating height H31 of the diffraction grating 11(R) is approximately 0.70 μm. In addition, since the 1 order diffraction efficiency of the diffraction grating 12(R) is preferably lower than the 1 order diffraction efficiency of the diffraction grating 11(R), the grating height H32 of the diffraction grating 12(R) is lower than approximately 0.70 μm. Therefore, it is possible to optimize the light amount distribution which is emitted from the diffraction grating 12(R).

In the red translucent member 1(R) which is formed in this manner, since the grating period P3 of the diffraction grating 11(R) and the diffraction grating 12(R) is equal, the light beam which is transmitted within the translucent member 1(R) at full reflection to reach the diffraction grating 12(R) is emitted at the same angle as the incident angle. Accordingly, light which is emitted at the same angle as the incident angle is reproduced. At this time, regarding the diffraction grating of the red translucent member 1(R), since the grating height is set such that the diffraction efficiency is high in the wavelength of the red light L(R), the diffraction efficiency with respect to the blue light L(B) and the green light L(G) is low. For this reason, it is possible to suppress the influence of unnecessary diffraction light.

In the pupil expansion element 10b of the present embodiment, the blue light L(B), the green light L(G), and the red light L(R) which are emitted from the blue translucent member 1(B) are sequentially incident to the green translucent member 1(G) and the red translucent member 1(R) and are diffracted by the diffraction gratings which are provided in these light guiding plates. In addition, the blue light L(B), the green light L(G), and the red light L(G) which are emitted from the green translucent member 1(G) are incident to the red translucent member 1(R) and the red translucent member 1(R) and are diffracted by the diffraction gratings which are provided in these light guiding plates. At this time, unnecessary diffraction light of which the angle is other than the necessary angle is emitted in the green translucent member 1(G) and the red translucent member 1(R). Even in this case, in a case where the diffraction angle of the unnecessary diffraction light is sufficiently greater than 7°, shielding or absorption is possible at a later stage.

Example of the Embodiment for Pupil Expansion Element 10b

In the embodiment, when configuring the pupil expansion element 10b, it is possible to use the optical element 1000 which is described with reference to FIG. 1 to FIG. 6, For example, when configuring the diffraction gratings 11(B) and 12(B), it is possible to use the optical element 1000 of Embodiment 1 which is described with reference to FIG. 1. In this case, the diffraction grating 11(b) is equivalent to the first diffraction grating 710 and the diffraction grating 12(b) is equivalent to the second diffraction grating 720. The translucent member 1(B) is equivalent to the first substrate 100, the first filler 971, and the second substrate 200. The same applies to cases of configuring the other diffraction gratings 11(G) and 12(G) and the other diffraction gratings 11(R) and 12(R).

In addition, when configuring the pupil expansion element 10b, it is possible to use the optical element 1000 of Embodiment 2 which is described with reference to FIG. 4. In this case, for example, the diffraction grating 11(B) is equivalent to the first diffraction grating 710 and the diffraction grating 12(B) is equivalent to the second diffraction grating 720. The translucent member 1(B) is equivalent to the first substrate 100, the first filler 971, and the second substrate 200. In addition, the diffraction grating 11(G) is equivalent to the third diffraction grating 730 and the diffraction grating 12(G) is equivalent to the fourth diffraction grating 740. The translucent member 1(G) is equivalent to the third substrate 300, the second filler 972, and the fourth substrate 400.

In addition, when configuring the pupil expansion element 10b, it is possible to use the optical element 1000 according to Modification Example 2 of Embodiment 2 which is described with reference to FIG. 5. In this case, the diffraction grating 11(B) is equivalent to the first diffraction grating 710 and the diffraction grating 12(B) is equivalent to the second diffraction grating 720. The translucent member 1(B) is equivalent to the first substrate 100, the first filler 971, and the second substrate 200. In addition, the diffraction grating 11(G) is equivalent to the third diffraction grating 730 and the diffraction grating 12(G) is equivalent to the fourth diffraction grating 740. The translucent member 1(G) is equivalent to the third substrate 300, the second filler 972, and the fourth substrate 400. In addition, the diffraction grating 11(R) is equivalent to the fifth diffraction grating 750 and the diffraction grating 12(R) is equivalent to the sixth diffraction grating 760. The translucent member 1(R) is equivalent to the fifth substrate 500, the fourth filler 974, and the sixth substrate 600.

Modification Example of Pupil Expansion Element 10b

In the pupil expansion element 10b according to the embodiments described above, the blue translucent member 1(B), the green translucent member 1(G), and the translucent member 1(R) are arranged in order along the optical axis L from the incident side of the image light to the emission side. However, in the pupil expansion element 10b, the red translucent member 1(R), the green translucent member 1(G), and the blue translucent member 1(B) may be arranged in order along the optical axis L from the incident side of the image light to the emission side.

In addition, the pupil expansion element 10b has three light guiding plates (the translucent members 1(B), 1(G), and 1(R)) in the embodiments described above; however, a configuration which has two light guiding plates may be adopted. In this case, for example, one out of the two light guiding plates expands the light flux diameter of the blue light L(B) and the green light L(G) and the other one expands the light flux diameter of the red light L(R). For the pupil expansion element 10b, it is possible to use, for example, the optical element 1000 of Embodiment 2 which is described with reference to FIG. 4.

The entire disclosure of Japanese Patent Application No. 2016-058100, filed Mar. 23, 2016 is expressly incorporated by reference herein.

What is claimed is:

1. An optical element comprising:
a first translucent substrate which is provided with a first surface and a second surface which is a surface on an opposite side of the first surface;
a second translucent substrate which is provided with a third surface which is opposed to the second surface and a fourth surface which is a surface on an opposite side of the third surface;
a first diffraction grating which is provided on at least one of the first surface and the second surface;
a second diffraction grating which is provided on at least one of the third surface and the fourth surface; and
a first adhesive layer which includes a first gap material which is interposed between the second surface and the third surface and which adheres the second surface and the third surface,
wherein the first diffraction grating is provided on the first surface,
the second diffraction grating is provided on the fourth surface,
the first adhesive layer is provided on an outside of an effective region through which light passes, and
a first filler is filled between the second surface and the third surface in the effective region.

2. The optical element according to claim 1,
wherein
the first filler has a refractive index equal to that of the first substrate and the second substrate.

3. The optical element according to claim 2, further comprising:
a third translucent substrate which is provided with a fifth surface which is opposed to the fourth surface and a sixth surface which is a surface on an opposite side of the fifth surface;
a fourth translucent substrate which is provided with a seventh surface which is opposed to the sixth surface and an eighth surface which is a surface on an opposite side of the seventh surface;
a third diffraction grating which is provided on the fifth surface;
a fourth diffraction grating which is provided on the eighth surface;
a second adhesive layer which includes a second gap material which is interposed between the sixth surface and the seventh surface and which adheres the sixth surface and the seventh surface outside the effective region;
a second filler which is filled between the sixth surface and the seventh surface in the effective region and with a refractive index equal to that of the third substrate and the fourth substrate;
a third adhesive layer which includes a third gap material which is interposed between the fourth surface and the fifth surface and which adheres the fourth surface and the fifth surface outside the effective region; and a third filler which is filled between the fourth surface and the fifth surface in the effective region and which is formed of air or a medium with a refractive index equal to that of air.

4. The optical element according to claim 1, wherein the first diffraction grating is provided at least on the second surface, the second diffraction grating is provided at least on the third surface, the first adhesive layer is provided outside the effective region through which light passes, and a filler which is formed of air or a medium with a refractive index equal to that of air is filled between the second surface and the third surface in the effective region.

5. The optical element according to claim 2, wherein a plurality of concave portions or convex portions which each extend in a first direction are arrayed periodically in the first diffraction grating and the second diffraction grating, and the plurality of concave portions or convex portions of each of the first diffraction grating and the second diffraction grating are arranged such that grating periods of the first diffraction grating and of the second diffraction grating are the same as each other.

6. The optical element according to claim 5, wherein refractive indices of the first substrate, the first filler, and the second substrate are refractive indices where +1 order diffraction light of a first light beam which is incident to the first diffraction grating is incident with respect to each of the first surface and the fourth surface at an angle of a critical angle or more and −1 order diffraction light of the first light beam which is incident to the first diffraction grating is incident with respect to each of the first surface and the fourth surface at an angle of a critical angle or more.

7. The optical element according to claim 3, wherein a plurality of concave portions or convex portions which each extend in a first direction are arrayed periodically in the first diffraction grating and the second diffraction grating, a plurality of concave portions or convex portions which each extend in the first direction or in a second direction which intersects with the first direction are arrayed periodically in the third diffraction grating and the fourth diffraction grating, the plurality of concave portions or convex portions of each of the first diffraction grating and the second diffraction grating are arranged such that grating periods of the first diffraction grating and of the second diffraction grating are the same as each other, and the plurality of concave portions or convex portions of each of the third diffraction grating and the fourth diffraction grating are arranged such that grating periods of the third diffraction grating and of the fourth diffraction grating are the same as each other.

8. The optical element according to claim 7, wherein the plurality of concave portions or convex portions of each of the third diffraction grating and the fourth diffraction grating each extend in the first direction, a grating period of the first diffraction grating is different from that of the third diffraction grating, a refractive index of the first substrate is a refractive index where +1 order diffraction light of a first light beam which is incident to the first diffraction grating is incident with respect to each of the first surface and the fourth surface at an angle of a critical angle or more and −1 order diffraction light of the first light beam which is incident to the first diffraction grating is incident with respect to each of the first surface and the fourth surface at an angle of a critical angle or more, and a refractive index of the third substrate is a refractive index where +1 order diffraction light of a second light beam when the second light beam of which a wavelength is different from that of the first light beam is incident to the third diffraction grating is incident with respect to each of the fifth surface and the eighth surface at an angle of a critical angle or more and −1 order diffraction light of the second light beam which is incident to the third diffraction grating is incident with respect to each of the fifth surface and the eighth surface at an angle of a critical angle or more.

9. The optical element according to claim 8, wherein, when a grating period of the first diffraction grating is P1 and a grating period of the third diffraction grating is P2, the grating periods P1 and P2 satisfy the following relationship $P1<P2.$ 10. The optical element according to claim 9, wherein, when a grating height of the first diffraction grating is H11 and a grating height of the third diffraction grating is H21, the grating heights H11 and H21 satisfy the following relationship $H11<H21.$ 11. The optical element according to claim 10, wherein, when a grating height of the second diffraction grating is H12 and a grating height of the fourth diffraction grating is H22, the grating heights H11, H12, H21, and H22 satisfy the following relationship $H12<H11<H22<H21.$ 12. The optical element according to claim 4, wherein a plurality of concave portions or convex portions which extend in a first direction are arrayed periodically in the first diffraction grating, and the plurality of concave portions or convex portions which extend in the first direction or in a second direction which intersects with the first direction are arrayed periodically in the second diffraction grating.

13. The optical element according to claim 2, wherein a plurality of concave portions or convex portions are each arrayed periodically in a first direction and in a second direction which intersects with the first direction in the first diffraction grating and the second diffraction grating, and the plurality of concave portions or convex portions of each of the first diffraction grating and the second diffraction grating are arranged such that grating periods along the first direction are the same periods as each other and grating periods along the second direction are the same periods as each other.

14. The optical element according to claim 3, wherein a plurality of concave portions or convex portions are each arrayed periodically in a first direction and in a second direction which intersects with the first direction in the first diffraction grating, the second diffraction grating, the third diffraction grating, and the fourth diffraction grating, and the plurality of concave portions or convex portions of each of the first diffraction grating, the second diffraction grating, the third diffraction grating, and the fourth diffraction grating are arranged such that grating periods along the first direction are the same periods as each other and grating periods along the second direction are the same periods as each other.

15. A display apparatus comprising:
the optical element according to claim 1;
a light source which emits light flux;
a scanning optical system which makes an image by scanning light flux which is emitted from the light source; and
an optical guiding system which makes the light flux which is scanned by the scanning optical system incident to eyes of a user,
wherein the optical element is arranged in a light path which covers from the scanning optical system to the optical guiding system or a light path of the optical guiding system.

16. A display apparatus comprising:
the optical element according to claim 2;
a light source which emits light flux;
a scanning optical system which makes an image by scanning light flux which is emitted from the light source; and
an optical guiding system which makes the light flux which is scanned by the scanning optical system incident to eyes of a user,
wherein the optical element is arranged in a light path which covers from the scanning optical system to the optical guiding system or a light path of the optical guiding system.

17. A display apparatus comprising:
the optical element according to claim 3;
a light source which emits light flux;
a scanning optical system which makes an image by scanning light flux which is emitted from the light source; and
an optical guiding system which makes the light flux which is scanned by the scanning optical system incident to eyes of a user,
wherein the optical element is arranged in a light path which covers from the scanning optical system to the optical guiding system or a light path of the optical guiding system.

18. A display apparatus comprising:
the optical element according to claim 4;
a light source which emits light flux;
a scanning optical system which makes an image by scanning light flux which is emitted from the light source; and
an optical guiding system which makes the light flux which is scanned by the scanning optical system incident to eyes of a user,
wherein the optical element is arranged in a light path which covers from the scanning optical system to the optical guiding system or a light path of the optical guiding system.

19. A display apparatus comprising:
the optical element according to claim 5;
a light source which emits light flux;
a scanning optical system which makes an image by scanning light flux which is emitted from the light source; and
an optical guiding system which makes the light flux which is scanned by the scanning optical system incident to eyes of a user,
wherein the optical element is arranged in a light path which covers from the scanning optical system to the optical guiding system or a light path of the optical guiding system.

20. A display apparatus comprising:
the optical element according to claim 7;
a light source which emits light flux;
a scanning optical system which makes an image by scanning light flux which is emitted from the light source; and
an optical guiding system which makes the light flux which is scanned by the scanning optical system incident to eyes of a user,
wherein the optical element is arranged in a light path which covers from the scanning optical system to the optical guiding system or a light path of the optical guiding system.

* * * * *